(12) United States Patent
Blaha, Jr. et al.

(10) Patent No.: US 12,196,913 B2
(45) Date of Patent: Jan. 14, 2025

(54) ESTIMATION OF REFERENCE BAROMETRIC PRESSURE BY USING DISSIMILAR PRESSURE REFERENCES

(71) Applicant: Polaris Wireless, Inc., Mountain View, CA (US)

(72) Inventors: Jerome Arthur Blaha, Jr., Redwood City, CA (US); Scot Douglas Gordon, Redmond, CA (US); Jeffrey Noel Wu, Santa Clara, CA (US); Jian Zhu, Cupertino, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 358 days.

(21) Appl. No.: 17/225,378

(22) Filed: Apr. 8, 2021

(65) Prior Publication Data

US 2021/0325565 A1 Oct. 21, 2021

Related U.S. Application Data

(60) Provisional application No. 63/012,445, filed on Apr. 20, 2020.

(51) Int. Cl.
*G01W 1/04* (2006.01)
*G01L 9/00* (2006.01)
*G01W 1/00* (2006.01)

(52) U.S. Cl.
CPC ............. *G01W 1/04* (2013.01); *G01L 9/0033* (2013.01); *G01W 2001/006* (2013.01)

(58) Field of Classification Search
CPC ........ G01C 5/06; G01C 21/206; G01C 21/20; G01C 5/00; G01W 1/04; G01W 2001/006; G01W 1/02; G01W 1/10; G01W 1/06; G01W 1/18; G01L 9/0033; H04W 4/029; H04W 4/33; H04W 4/025; H04W 4/02
See application file for complete search history.

(56) References Cited

U.S. PATENT DOCUMENTS

2015/0247917 A1\* 9/2015 Gum ...................... H04W 4/029
342/462
2017/0195984 A1\* 7/2017 Dormody ................. G01C 5/06
(Continued)

*Primary Examiner* — Manish S Shah
*Assistant Examiner* — Carter W Ferrell
(74) *Attorney, Agent, or Firm* — McGeary Cukor LLC; Kenneth Ottesen; Jason Paul DeMont

(57) ABSTRACT

A method for providing an enhanced estimate of reference barometric pressure. The method uses multiple, dissimilar pressure references, such as in airport weather stations, personal weather stations, and wireless terminals such as smartphones, in order to provide the enhanced estimate of reference barometric pressure. The method generates an enhanced estimate of reference barometric pressure based on a first estimate of reference barometric pressure from a first pressure reference network made up of airport weather stations, for example. The method also uses a second estimate of reference barometric pressure from a second pressure reference network made of up personal weather stations, for example, and a third estimate of reference barometric pressure, also from the second network. The first, second, and third estimates of reference barometric pressure are combined such that both measurement accuracy and timeliness are improved in the resulting, enhanced estimate.

9 Claims, 14 Drawing Sheets

(56) References Cited

U.S. PATENT DOCUMENTS

2018/0252521 A1\* 9/2018 Dormody ............... G01C 25/00
2020/0116483 A1\* 4/2020 Dormody ................ G01C 5/06
2021/0018656 A1\* 1/2021 Seibert ................ G01C 21/206

\* cited by examiner

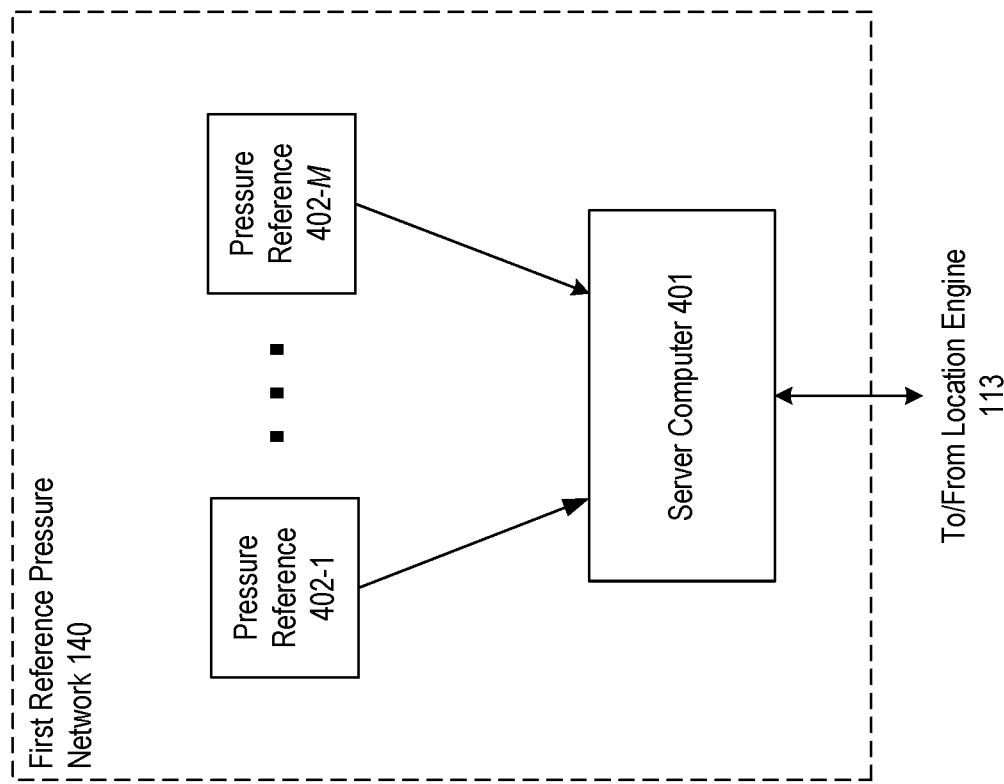

ESTIMATION OF REFERENCE BAROMETRIC PRESSURE BY USING DISSIMILAR PRESSURE REFERENCES

CROSS REFERENCE TO RELATED APPLICATIONS

The following document is incorporated by reference herein: U.S. Provisional Application Ser. No. 63/012,445, filed Apr. 20, 2020. If there are any contradictions or inconsistencies in language between this application and any document that has been incorporated by reference that might affect the interpretation of the claims in this application, the claims in this application should be interpreted to be consistent with the language in this application.

FIELD OF THE INVENTION

The present invention relates to telecommunications in general and, more particularly, to a technique for generating an enhanced estimate of reference barometric pressure by using dissimilar pressure references, which estimate is used in determining the elevation of a wireless terminal.

BACKGROUND OF THE INVENTION

The salient advantage of wireless telecommunications over wireline telecommunications is that the user of a wireless terminal, such as a cell phone or smartphone, is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from measurements of electromagnetic signals that are reported by the wireless terminal. The reported measurements are of signals measured by the wireless terminal that are transmitted by one or more base stations and, in some cases, by a Global Navigation Satellite System (GNSS) such as the Global Positioning System (GPS).

In order for these techniques to work, at least some of the transmitted signals have to be strong enough to allow for accurate measurement by the wireless terminal and for reliable processing by the particular estimation technique. The measured strengths of the different signals can vary significantly in certain environments such as where signal obstructions are present, including natural obstructions such as mountains and artificial obstructions such as buildings. The measured strengths of the different signals can also vary significantly because of reflection, deflection, and scattering of the signals. This variation in measured signal strength can affect estimation of a wireless terminal's location, including its elevation.

There are techniques other than signal measurement in the prior art for estimating the elevation of a wireless terminal. Some of these techniques rely on the relationship between atmospheric pressure, $P_A$, and elevation, $Z_A$, in which $P_A$ decreases logarithmically with $Z_A$, according to the formula:

$$Z_A = -H * \ln\left(\frac{P_A}{P_0}\right) \qquad \text{(Eq. 1)}$$

wherein:
  $P_0$ is the reference atmospheric pressure, and
  H is the scale height of the atmosphere, which is the elevation at which the atmospheric pressure has decreased to $e^{-1}$ times its value at mean sea level (e.g., approximately 7000 meters).

It is known in the prior art how to estimate the elevation of an object—such as an airplane—using Equation 1. Aircraft altimeters have used this technique for decades, and it is known to be highly accurate. Furthermore, it is known in the prior art how to estimate the elevation of a wireless terminal using Equation 1.

In order to obtain barometrically a good estimate of elevation (also known as a "z-estimate"), it is necessary to have both i) a good pressure measurement at the location for which the estimate of elevation is being determined and ii) a good pressure measurement at a pressure reference. The measurement provided by the pressure reference can be used to determine an estimate of the sea-level pressure for a location of interest or the pressure of another reference.

An ideal pressure reference, within an overall pressure reference network of one or more pressure references, (i) provides barometric pressure measurements accurately, (ii) makes successive measurements available frequently, and (iii) makes each measurement available with minimal delay between measurement of pressure and availability of a measurement to an application such as location estimation. A pressure reference network having these ideal characteristics, however, is typically non-existent in some operational scenarios or costly to implement.

SUMMARY OF THE INVENTION

The present invention enables an enhanced estimate of reference barometric pressure, and without at least some of the costs and disadvantages in the prior art. In accordance with the illustrative embodiment of the present invention, a disclosed location engine uses multiple, dissimilar pressure references, such as in airport weather stations, personal weather stations, and wireless terminals such as smartphones, in order to provide the enhanced estimate of reference pressure.

As an example of some of the disadvantages in the prior art, an airport weather station that is being used as a pressure reference might provide pressure measurements that are relatively accurate, but that are relatively infrequent or delayed, or both. In contrast, a different type of device, such as a personal weather station or wireless terminal, might provide pressure measurements that are relatively frequent and with low delay, but that are relatively inaccurate when compared to measurements provided by an airport station. The location engine disclosed herein uses the different types of pressure references to synthesize estimates of reference pressure that are imbued with more of the desirable characteristics than estimates that are derived from only one type of pressure reference.

The inventors of the present invention recognized that in at least some types of pressure references that are relatively inaccurate, the measurement bias that is a primary cause of the inaccuracy is at least sufficiently stable over a useable range of measurements and over a period of time. As a result, a pressure reference that provides an inaccurate, individual measurement can still be capable of accurately measuring changes between two barometric pressure measurements, at least for measurements made within a few hours of each other. This is because the bias that is present in both measurements gets canceled out. An implication here is that the relative difference between two biased measurements separated in time, such as one hour apart, can be used to adjust an old measurement, such as from an hour ago, provided by a relatively accurate measurement source, such as an airport station. This adjustment can be used to generate a pressure measurement that is relatively both current and accurate—namely, the enhanced estimate of reference barometric pressure described herein.

The location engine receives a first estimate of reference barometric pressure corresponding to time $t_1$ made by a first pressure reference network. For example, time $t_1$ is one hour ago, and the first pressure reference network is made up of airport weather stations. The first estimate of reference barometric pressure is based on at least a first measurement of barometric pressure made by a first pressure reference—illustratively, at an airport weather station. The first estimate of reference pressure can also be based on the current lateral location of a wireless terminal of interest (i.e., for which an estimate of elevation is being sought).

In the example, the location engine also receives a series of estimates of reference barometric pressure made available by a second pressure reference network comprising a second pressure reference, such as a personal weather station, wherein the series of estimates comprises a second estimate of reference barometric pressure corresponding to time $t_2$ and a third estimate of reference barometric pressure corresponding to time $t_3$. In some embodiments of the present invention, a reference pressure estimate that has a time $t_2$ as close to time $t_1$ as possible is selected from the series to be the second estimate. In some embodiments of the present invention, a reference pressure estimate that has a time $t_3$ as close to time $t_4$ as possible is selected from the series to be the third estimate, wherein time $t_4$ corresponds to when a pressure measurement is made by the wireless terminal of interest (e.g., the current time, etc.). The second estimate of reference barometric pressure is based on at least a second measurement of barometric pressure made by the second pressure reference, and the third estimate of reference barometric pressure is based on at least a third measurement of barometric pressure made by the second pressure reference.

The location engine generates an enhanced estimate of reference barometric pressure based on: (i) the first estimate of reference barometric pressure from the first pressure reference network, (ii) the second estimate of reference barometric pressure from the second pressure reference network, (iii) the third estimate of reference barometric pressure, also from the second network. For example, subtracting the second estimate (from an hour ago) from the third estimate (from the current time) essentially cancels out the measurement bias in the two estimates, and the difference can then be added to the first estimate (from an hour ago) in order to generate a (current) estimate of the reference barometric pressure. In doing so, advantages of each pressure reference network are combined in generating the estimate of reference barometric pressure, thereby creating an enhanced estimate in comparison to one that either pressure reference network by itself is capable of providing.

The location engine is then able to generate an estimate of the elevation of the wireless terminal of interest based on: (i) the pressure measurement made by the wireless terminal and (ii) the enhanced estimate of reference barometric pressure. As those who are skilled in the art will appreciate after reading this disclosure, the enhanced estimate of reference barometric pressure can be used for other applications, in addition to or instead of generating an estimate of the elevation of the wireless terminal.

A first illustrative method comprises: receiving, by a data processing system, a first estimate of reference barometric pressure corresponding to time $t_1$ by a first pressure reference network and corresponding to a first lateral location, wherein the first estimate of reference barometric pressure is based on i) the first lateral location and ii) at least a first measurement of barometric pressure made by a first pressure reference at a second lateral location, and wherein the first pressure reference network comprises the first pressure reference; receiving, by the data processing system, a series of estimates of reference barometric pressure made available by a second pressure reference network comprising a second pressure reference, wherein the series of estimates comprises: i) a second estimate of reference barometric pressure corresponding to time $t_2$, wherein the second estimate of reference barometric pressure is based on at least a second measurement of barometric pressure made by the second pressure reference, and ii) a third estimate of reference barometric pressure corresponding to time $t_3$, wherein the third estimate of reference barometric pressure is based on at least a third measurement of barometric pressure made by the second pressure reference; receiving, by the data processing system, a fourth measurement of barometric pressure made by a first wireless terminal at time $t_4$ while at the first lateral location; generating an enhanced estimate of reference barometric pressure based on: i) the first estimate of reference barometric pressure corresponding to the first lateral location, ii) the second estimate of reference barometric pressure, and iii) the third estimate of reference barometric pressure; and generating an estimate of the elevation of the first wireless terminal based on: i) the fourth measurement of barometric pressure made by the first wireless terminal, and ii) the enhanced estimate of reference barometric pressure.

A second illustrative method comprises: receiving, by a data processing system, a first estimate of reference barometric pressure corresponding to time $t_1$ by a first pressure reference network comprising a first pressure reference, wherein the first estimate of reference barometric pressure is based on at least a first measurement of barometric pressure made by the first pressure reference; receiving, by the data processing system, a series of estimates of reference barometric pressure made available by a second pressure reference network comprising a second pressure reference, wherein the series of estimates comprises: i) a second estimate of reference barometric pressure corresponding to time $t_2$, wherein the second estimate of reference barometric pressure is based on at least a second measurement of barometric pressure made by the second pressure reference, and ii) a third estimate of reference barometric pressure corresponding to time $t_3$, wherein the third estimate of reference barometric pressure is based on at least a third measurement of barometric pressure made by the second pressure reference, wherein the interval between time $t_2$ and time $t_3$ is less than the interval between i) time $t_1$ and ii) the time at which the next estimate of reference barometric pressure is made available after time $t_1$ by the first pressure reference network; receiving, by the data processing system, a fourth measurement of barometric pressure made by a first wireless terminal at time $t_4$; generating an enhanced estimate of reference barometric pressure based on: i) the first estimate of reference barometric pressure, ii) the second estimate of reference barometric pressure, and iii) the third estimate of reference barometric pressure; and generating an estimate of the elevation of the first wireless terminal based on: i) the fourth measurement of barometric pressure made by the first wireless terminal, and ii) the enhanced estimate of reference barometric pressure.

A third illustrative method comprises: receiving, by a data processing system, a first estimate of reference barometric pressure corresponding to time $t_1$ by a first pressure reference network comprising a first pressure reference, wherein the first estimate of reference barometric pressure is based on at least a first measurement of barometric pressure made by the first pressure reference; receiving, by the data processing system, a series of estimates of reference barometric pressure made available by a second pressure reference network comprising a second pressure reference, wherein the series of estimates comprises: i) a second estimate of reference barometric pressure corresponding to time $t_2$, wherein the second estimate of reference barometric pressure is based on at least a second measurement of barometric pressure made by the second pressure reference, and ii) a third estimate of reference barometric pressure corresponding to time $t_3$, wherein the third estimate of reference barometric pressure is based on at least a third measurement of barometric pressure made by the second pressure reference, wherein the delay between when i) the second pressure reference makes the second measurement of barometric pressure and ii) the second pressure reference network makes available the second estimate of reference barometric pressure, is less than the delay between when i) the first pressure reference makes the first measurement of barometric pressure and ii) the first pressure reference network makes available the first estimate of reference barometric pressure; receiving, by the data processing system, a fourth measurement of barometric pressure made by a first wireless terminal at time $t_4$; generating an enhanced estimate of reference barometric pressure based on: i) the first estimate of reference barometric pressure, ii) the second estimate of reference barometric pressure, and iii) the third estimate of reference barometric pressure; and generating an estimate of the elevation of the first wireless terminal based on: i) the fourth measurement of barometric pressure made by the first wireless terminal, and ii) the enhanced estimate of reference barometric pressure.

BRIEF DESCRIPTION OF THE DRAWINGS

FIG. 4 depicts a block diagram of the salient components of first pressure reference network 140.

FIG. 5 depicts a block diagram of the salient components of second pressure reference network 150.

DEFINITIONS

Figure 1:
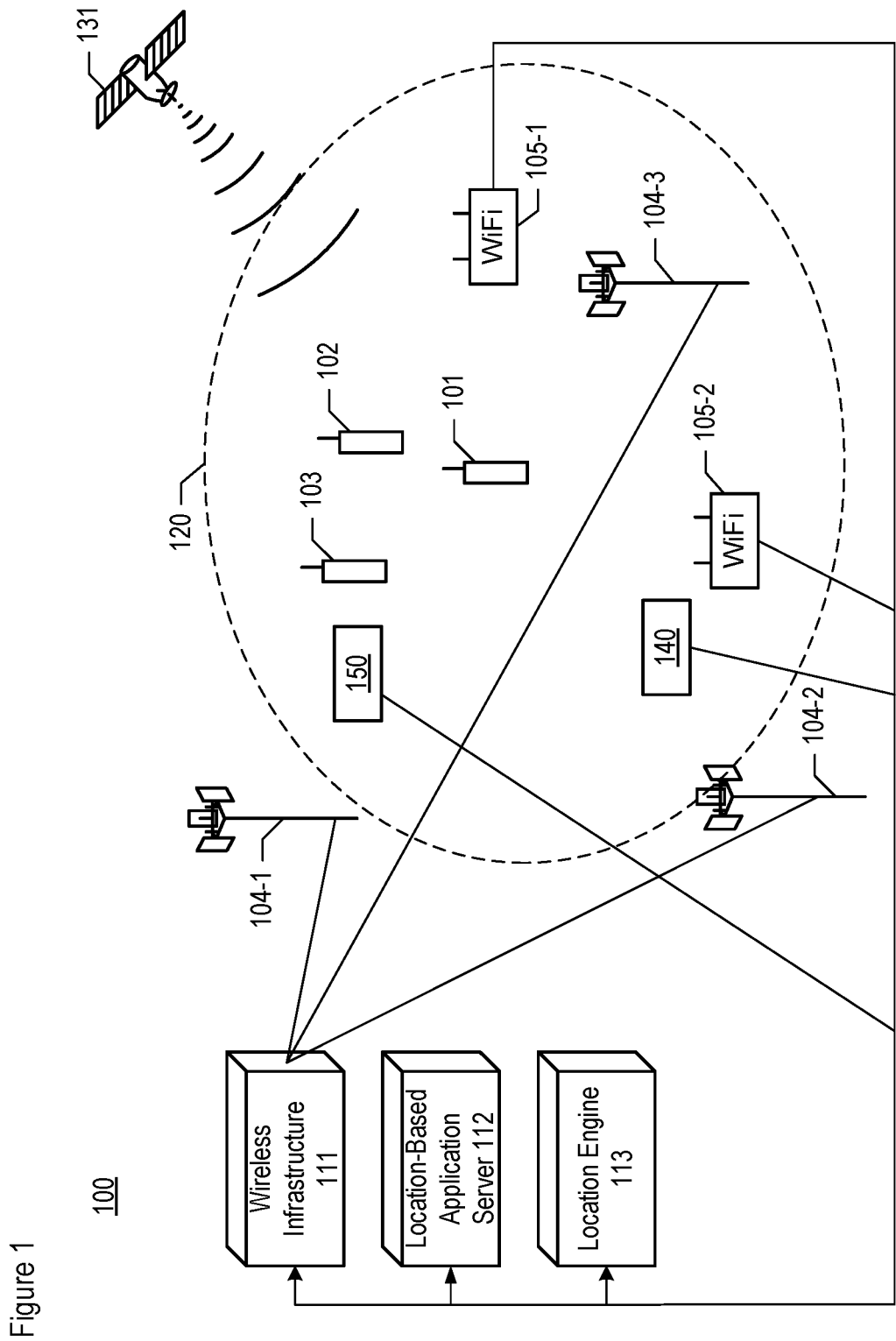
FIG. 1 depicts a diagram of the salient components of wireless telecommunications system 100 in accordance with the illustrative embodiment of the present invention.

Barometric Pressure—For the purposes of this disclosure, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this disclosure, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Bias—For the purposes of this disclosure, the term "bias" is defined as a systematic distortion of a statistical result (e.g., a measurement, etc.) due to a factor not allowed for in its derivation.

Elevation—For the purposes of this disclosure, the term "elevation" is defined as the height relative to a reference (e.g., mean sea level, ground level, etc.).

Generate—For the purposes of this disclosure, the infinitive "to generate" and its inflected forms (e.g., "generating", "generation", etc.) should be given the ordinary and customary meaning that the terms would have to a person of ordinary skill in the art at the time of the invention.

Geographic Information System—For the purposes of this disclosure, the phrase "geographic information system (GIS)" is defined as a system designed to capture, store, manipulate, analyze, manage, and present spatial or geographic data.

Height—For the purposes of this disclosure, the term "height" should be given the ordinary and customary meaning that the term would have to a person of ordinary skill in the art at the time of the invention.

Identity of a Radio Signal—For the purposes of this disclosure, the phrase "identity of a radio signal" is defined as one or more indicia that distinguish one radio signal from another radio signal.

Lateral Location—For the purposes of this disclosure, a "lateral location" is defined as information that is probative of latitude or longitude or latitude and longitude.

Location—For the purposes of this disclosure, the term "location" is defined as a zero-dimensional point, a finite one-dimensional path segment, a finite two-dimensional surface area, or a finite three-dimensional volume.

Location-Dependent Information—For the purposes of this disclosure, the term "location-dependent information" is defined as information that varies with location. For example and without limitation, location-dependent information can be:
  i. a measurement of a location-dependent trait (e.g., signal strength, etc.) of a radio signal as received by the wireless terminal,
  ii. the identity of a radio signal as received by the wireless terminal (e.g., in a service environment in which different radio signals transmitted from different locations are assigned different identities, etc.), or
  iii. the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this disclosure, the term "location-dependent trait of a radio signal" is defined as a characteristic of a radio signal that varies with:
  i. the location of the transmitter of the signal, or
  ii. the location of the receiver of the signal, or
  iii. both i and ii.

For example and without limitation, the amplitude and phase of a radio signal are generally location-dependent traits of the signal. In contrast, the frequency of a given radio signal is generally not a location-dependent trait of the signal.

Processor—For the purposes of this disclosure, a "processor" is defined as hardware or hardware and software that performs mathematical and/or logical operations.

Radio—For the purposes of this disclosure, a "radio" is defined as hardware or hardware and software that is capable of telecommunications via an unguided (i.e., wireless) radio signal of frequency less than 600 GHz.

Receive—For the purposes of this disclosure, the infinitive "to receive" and its inflected forms (e.g., "receiving", "received", etc.) should be given the ordinary and customary meaning that the terms would have to a person of ordinary skill in the art at the time of the invention.

Transmit—For the purposes of this disclosure, the infinitive "to transmit" and its inflected forms (e.g., "transmitting", "transmitted", etc.) should be given the ordinary and customary meaning that the terms would have to a person of ordinary skill in the art at the time of the invention.

Wireless Terminal—For the purposes of this disclosure, the term "wireless terminal" is defined as a device that is capable of telecommunications without a wire or tangible medium. A wireless terminal can be mobile or immobile. A wireless terminal can transmit or receive or transmit and receive. A wireless terminal is also commonly called a smartphone, a cellular telephone ("cellphone"), a wireless transmit/receive unit (WTRU), a user equipment (UE), a mobile station, wireless handset, a fixed or mobile subscriber unit, a pager, a personal digital assistant (PDA), an Internet of Things (IoT) device, a computer, or any other type of device capable of operating in a wireless environment are examples of wireless terminals.

DETAILED DESCRIPTION

Wireless Telecommunications System 100—FIG. 1 depicts a diagram of the salient components of wireless telecommunications system 100 in accordance with the illustrative embodiment of the present invention. Wireless telecommunications system 100 comprises: wireless terminals 101, 102, and 103, cellular base stations 104-1, 104-2, and 104-3, Wi-Fi base stations 105-1 and 105-2, wireless infrastructure 111, location-based application server 112, location engine 113, Global Positioning System (GPS) constellation 131, first pressure reference network 140, and second pressure reference network 150, interrelated as shown.

Wireless infrastructure 111, location-based application server 112, location engine 113, cellular base station 104-1, 104-2, and 104-3, Wi-Fi base stations 105-1 and 105-2, network 140, and network 150 are all connected to one or more interconnected computer networks (e.g., the Internet, a local-area network, a wide-area network, etc.) and, as such, can exchange data.

Wireless terminals 101, 102, and 103 are devices that are capable of providing bi-directional voice, data, and video telecommunications services to their respective users. Each wireless terminal comprises the hardware and software necessary to perform the tasks disclosed herein, and is further described below and in regard to FIG. 2. Furthermore, each wireless terminal is mobile and can be at any location within geographic region 120 at any time.

Wireless terminals 101, 102, and 103 can perform at least some of the processes described below and in the accompanying figures. For example and without limitation, wireless terminals 101, 102, and 103 are capable of:
  i. receiving one or more radio signals transmitted by cellular base stations 104-1, 104-2, and 104-3, Wi-Fi base stations 105-1 and 105-2, and GPS constellation 131, and
  ii. identifying each radio signal transmitted by cellular base stations 104-1, 104-2, and 104-3, Wi-Fi base stations 105-1 and 105-2, and GPS constellation 131, and of transmitting the identities of those signals, or information related to the identity of those signals, to location engine 113, and
  iii. measuring one or more location-dependent traits of each radio signal transmitted by cellular base stations 104-1, 104-2, and 104-3, Wi-Fi base stations 105-1 and 105-2, and GPS constellation 131, and of transmitting the measurements to location engine 113, and
  iv. estimating lateral location x-y and elevation z, based on one or more of the received and/or measured radio signals, and
  v. transmitting one or more signals to cellular base stations 104-1, 104-2, and 104-3, Wi-Fi base stations 105-1 and 105-2 in accordance with specific parameters (e.g., signal strength, frequency, coding, modulation, etc.), and of transmitting those parameters and estimated location to location engine 113, and
  vi. measuring the temperature and barometric pressure at the wireless terminal and transmitting those measurements to location engine 113.

Wireless terminals 101, 102, and 103 provide the aforementioned telecommunications services to its user and performs the aforementioned tasks. It will, however, be clear to those skilled in the art, after reading this disclosure, how to make and use embodiments of the present invention in which wireless terminals 101, 102, and/or 103 provide a different set of services or perform a different set of tasks.

Wireless terminals 101, 102, and 103 receive precise location data from one or more satellites in GPS constellation 131. As those who are skilled in the art will appreciate after reading this disclosure, wireless terminals 101, 102, and/or 103 can use technologies other than GPS for location purposes in some other embodiments of the present invention. As those who are skilled in the art will also appreciate after reading this disclosure, wireless terminals 101, 102, and 103 can use a Global Navigation Satellite System (GNSS) other than GPS for location purposes, such as GLONASS, Galileo, Beidou, and other regional systems, for example and without limitation.

Although the illustrative embodiment depicts wireless telecommunications system 100 as comprising one wireless terminal, it will be clear to those skilled in the art, after reading this disclosure, how to make and use alternative embodiments of the present invention that comprise any number of wireless terminals.

Cellular base stations 104-1, 104-2, and 104-3 communicate with wireless infrastructure 111 via wireline and with wireless terminals 101, 102, and 103 via radio. Cellular base stations are also commonly referred to by a variety of alternative names such as access points, nodes, network interfaces, and so forth. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 104-1, 104-2, and 104-3 are terrestrial and immobile, and base station 104-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 104-1, 104-2, and 104-3 comprise the hardware and software necessary to be Long-Term Evolution (LTE) 3GPP-compliant and to perform the processes described below and in the accompanying figures. In some alternative embodiments of the present invention, base stations 104-1, 104-2, and 104-3 communicate in accordance with a different cellular standard. Each of cellular base stations 104-1, 104-2, and 104-3 are capable of continually, for example and without limitation:

i. receiving one or more radio signals transmitted by wireless terminals 101, 102, and 103, and
ii. identifying each radio signal transmitted by wireless terminals 101, 102, and 103, and of transmitting the identities of those signals to location engine 113, and
iii. measuring one or more location-dependent traits of each radio signal transmitted by wireless terminals 101, 102, and 103, and of transmitting the measurements to location engine 113, and
iv. transmitting one or more signals to wireless terminals 101, 102, and 103 in accordance with specific parameters (e.g., signal strength, frequency, coding, modulation, etc.), and of transmitting those parameters to location engine 113, and
v. broadcasting one or more signals that wireless terminals can use for various purposes (e.g., mobile assisted handoff, location determination, etc.).

Wi-Fi base stations 105-1 and 105-2 communicate with wireless terminals 101, 102, and 103 via radio and in accordance with a WiFi protocol. Wi-Fi base stations are also commonly referred to by a variety of alternative names such as access points, nodes, network interfaces, and so forth. In some alternative embodiments of the present invention, base stations 105-1 and 105-2 communicate in accordance with a different IEEE 802.11 standard or wireless LAN standard entirely. Wi-Fi base stations 105-1 and 105-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 105-1 and 105-2 are capable of continually:

i. receiving one or more radio signals transmitted by wireless terminals 101, 102, and 103, and
ii. identifying each radio signal transmitted by wireless terminals 101, 102, and 103, and of transmitting the identities of those signals to location engine 113, and
iii. measuring one or more location-dependent traits of each radio signal transmitted by wireless terminals 101, 102, and 103, and of transmitting the measurements to location engine 113, and
iv. transmitting one or more signals to wireless terminals 101, 102, and 103 in accordance with specific parameters (e.g., signal strength, frequency, coding, modulation, etc.), and of transmitting those parameters to location engine 113, and
v. broadcasting one or more signals that wireless terminals can use for various purposes (e.g., mobile assisted handoff, location determination, etc.).

Wireless infrastructure 111 comprises a switch that orchestrates the provisioning of telecommunications service to wireless terminals 101, 102, and 103 and the flow of information to and from location engine 113, as described below and in the accompanying figures. As is known to those skilled in the art, wireless switches are also commonly referred to by other names such as mobile switching centers, mobile telephone switching offices, routers, and so on.

Location-based application server 112 comprises hardware and software that uses the estimate of the locations of wireless terminals 101, 102, and 103—generated by location engine 113—in a location-based application. Location-based applications are known in the art and provide services such as, and without limitation, E-911 routing, navigation, location-based advertising, weather alerts. In accordance with the illustrative embodiment, location-based application server 112 is implemented on a data-processing system made up of one or more server computers.

Location engine 113 is a data processing system that comprises hardware and software that generates one or more estimates of the locations of wireless terminals 101, 102, and 103 as described below and in the accompanying figures, including FIG. 3. In accordance with the illustrative embodiment, location engine 113 is implemented on a data-processing system made up of one or more server computers. Location engine 113 comprises the geographic information system (GIS) database and pressure reference network database, which are described in detail below. Location engine 113 is capable of accessing the Internet.

It will be clear to those skilled in the art, after reading this disclosure, how to make and use location engine 113. Furthermore, although location engine 113 is depicted in FIG. 1 as physically distinct from wireless infrastructure 111, it will be clear to those skilled in the art, after reading this disclosure, how to make and use alternative embodiments of the present invention in which location engine 113 is wholly or partially integrated into wireless infrastructure 111.

First pressure reference network 140 comprises hardware and software that provides a reference pressure estimate that corresponds to a specified lateral location. First network 140 comprises one or more pressure reference stations having a first set of characteristics. First pressure reference network 140 is described below and in FIG. 4.

Second pressure reference network 150 comprises hardware and software that provides a reference pressure estimate that corresponds to a specified lateral location. Second network 150 comprises one or more pressure reference stations having a second set of characteristics. Second pressure reference network 150 is described below and in FIG. 5.

Figure 2:
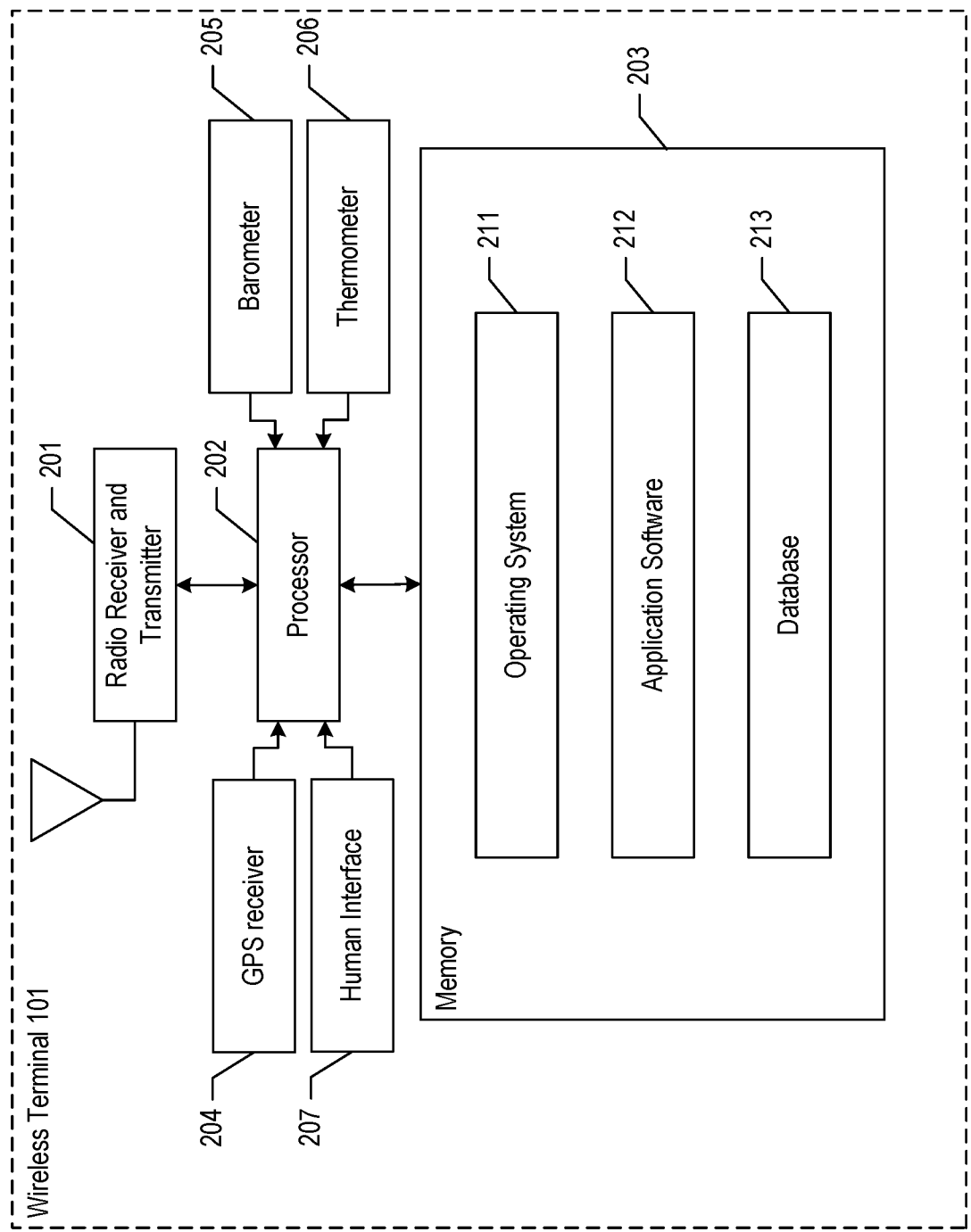
FIG. 2 depicts a block diagram of the salient components of wireless terminal 101 of telecommunications system 100.

Wireless Terminal 101—FIG. 2 depicts a block diagram of the salient components of wireless terminal 101 in accordance with the illustrative embodiment of the present invention. Wireless terminal 101 comprises: radio receiver and transmitter 201, processor 202, memory 203, GPS receiver 204, barometer 205, thermometer 206, and human interface 207, interconnected as shown. The block diagram depicted in FIG. 2 can also be considered representative of other wireless terminals, such as terminals 102 and 103.

Radio receiver and transmitter 201 comprises hardware and software that enables wireless terminal 101 to receive and analyze radio signals and to transmit radio signals. In accordance with the illustrative embodiment, wireless telecommunications service is provided to wireless terminal 101 in accordance with both the Long-Term Evolution (LTE) 4G air-interface standard of the $3^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G standard, a standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

GPS receiver 204 is hardware and software that enables wireless terminal 101 to determine its own location. GPS receiver 204 interacts with GPS satellites in constellation 131 and receives electromagnetic signals transmitted by one or more of the satellites. It will be clear to those skilled in the art how to make and use GPS receiver 204.

Barometer 205 is a barometric sensor device and typically comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

Thermometer 206 is a hardware temperature sensor that measures the ambient temperature at wireless terminal 101. In accordance with the illustrative embodiment, thermometer 206 comprises the Bosch BMP280 sensor, which also measures temperature in addition to pressure, but it will be clear to those skilled in the art, after reading this disclosure, how to make and use alternative embodiments of the present invention that use a different sensor to measure the ambient temperature at wireless terminal 101. For example, the ADT7420 temperature sensor from Analog Devices is capable of measuring temperature. In some embodiments of the present invention, wireless terminal 101 has no thermometer 206, in which case the system disclosed herein can determine ambient temperature, as needed, through other means. For example and without limitation, ambient temperature in the environment of terminal 101 can be determined from weather-station-reported temperature of said environment, or from a combination of said reported temperature and wireless-terminal-reported temperature.

Human interface 207 is hardware and software that enables a person to interact with wireless terminal 101. Human interface 207 comprises a display, keypad, microphone, and speaker. It will be clear to those skilled in the art how to make and use human interface 207.

Figure 3:
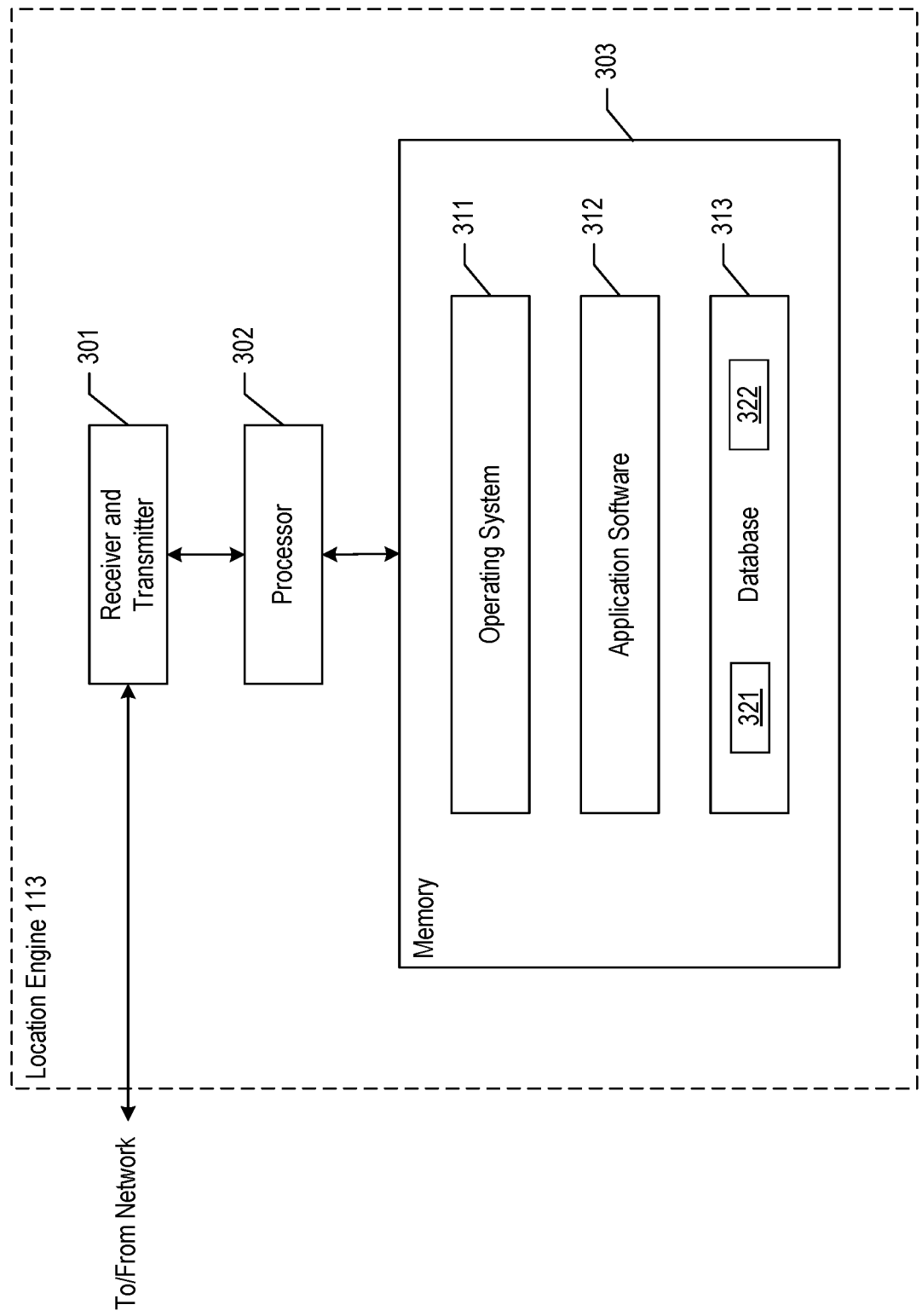
FIG. 3 depicts a block diagram of the salient components of location engine 113 of telecommunications system 100.

Location engine 113—FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter 301 enable location engine 113 to transmit to and receive from wireless terminals 101, 102, and 103, wireless infrastructure 111, location—based application server 112, first pressure reference network 140, second pressure reference network 150, cellular base stations 104-1, 104-2, and 104-3, Wi-Fi base stations 105-1 and 105-2, and the Internet. It will be clear to those skilled in the art how to make and use receiver and transmitter 301.

Figure 6:
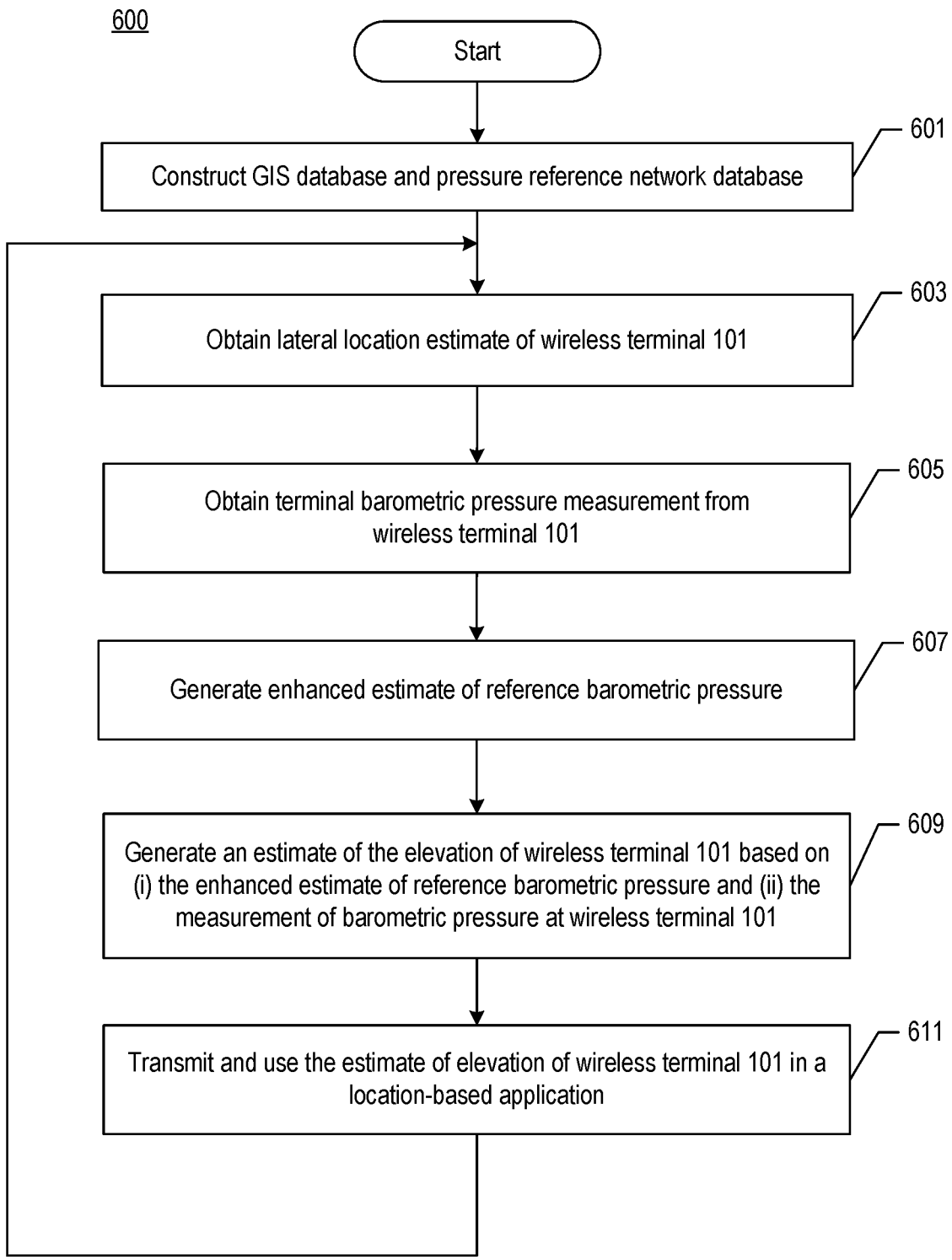
FIG. 6 depicts a flowchart of the salient processes performed as part of method 600 in accordance with the illustrative embodiment of the present invention.

Processor 302 is a general-purpose processor that can execute an operating system and the application software that performs at least some of the operations disclosed herein, including, but not limited to, those in FIG. 6. Processor 302 is also capable of populating, amending, using, and managing GIS database 321 and pressure reference network database 322, as described in detail below and in the accompanying figures. It will be clear to those skilled in the art how to make and use processor 302.

In general, GIS database 321 contains information for geographic region 120, including without limitation the physical characteristics of all of the structures in geographic region 120 (e.g., one or more exterior walls of each building, etc.), as described below. Pressure reference network database 322 contains information for obtaining reference pressure estimates from networks 140 and 150, and to store information needed to generate an enhanced estimate of reference pressure. It will be clear to those skilled in the art, after reading this disclosure, how to make and use GIS database 321 and pressure reference network database 322.

Memory 303 is a non-transitory, non-volatile memory that stores:

i. operating system 311, and
  ii. application software 312, and
  iii. GIS database 321 in database memory 313, and
  iv. pressure reference network database 322 in database memory 313.

It will be clear to those skilled in the art how to make and use memory 303.

First Pressure Reference Network 140—FIG. 4 depicts a block diagram of the salient components of first pressure reference network 140 in accordance with the illustrative embodiment. First pressure reference network 140 comprises: server computer 401 and pressure reference stations 402-1 through 402-M, wherein M is a positive integer, which are interconnected as shown.

Server computer 401 is a data processing system that comprises hardware and software that generates one or more estimates of reference barometric pressure corresponding to a specified lateral location. Server computer 401 receives a specified lateral location (e.g., of wireless terminal 101, etc.) from location engine 113 and, based on the specified lateral location, interpolates, or otherwise processes, one or more measurements of barometric pressure from one or more of pressure references 402-1 through 402-M. Server computer 401 does this in order to generate an estimate of reference barometric pressure on behalf of first pressure reference network 140 and corresponding to the specified lateral location. In some alternative embodiments of the present invention, server computer 401 is instead a process executed by, or is otherwise a part of, location engine 113. It will be clear to those skilled in the art, after reading this disclosure, how to make and use server computer 401.

Pressure reference 402-*m*, wherein m has a value between 1 and M, inclusive, comprises hardware and software that continually measures the atmospheric pressure (i.e., provides a measurement of barometric pressure at an outdoor location) and transmits those measurements to server computer 401. Pressure reference 402-*m* is at a known location in geographic region 120 and known elevation, and measures barometric pressure at an outdoor location, thereby not being subject to any stack effect.

In accordance with the illustrative embodiment, pressure reference 402-*m* is part of an airport weather station within a pressure reference network of stations having similar characteristics (e.g., other airport stations, etc.). Such an airport weather stations comprises sensor suites that are typically automated and that are designed to serve aviation and meteorological operations. Examples of airport weather stations include, without limitation, automated weather observing stations (AWOS), automated surface observing stations (ASOS), and automated weather sensor systems (AWSS). In some other embodiments of the present invention, pressure reference 402-*m* is part of a different type of station than an airport weather station.

It will be clear to those skilled in the art how to make and use embodiments of the present invention that comprise any number of pressure references 402 within first pressure reference network 140 that is capable of providing a representative measurement of barometric pressure corresponding to a specified location with region 120.

Second Pressure Reference Network 150—FIG. 5 depicts a block diagram of the salient components of second pressure reference network 150 in accordance with the illustrative embodiment. Second pressure reference network 150 comprises: server computer 501 and pressure reference stations 502-1 through 502-N, wherein N is a positive integer, which are interconnected as shown.

Server computer 501 is a data processing system that comprises hardware and software that generates one or more estimates of reference barometric pressure corresponding to a specified lateral location. Server computer 501 receives a specified lateral location (e.g., of wireless terminal 101, etc.) from location engine 113 and, based on the specified lateral location, interpolates, or otherwise processes, one or more measurements of barometric pressure from one or more of pressure references 502-1 through 502-N. Server computer 501 does this in order to generate an estimate of reference barometric pressure on behalf of second pressure reference network 150 and corresponding to the specified lateral location. In some alternative embodiments of the present invention, server computer 501 is instead a process executed by, or is otherwise a part of, location engine 113. It will be clear to those skilled in the art, after reading this disclosure, how to make and use server computer 501.

Pressure reference 502-*n*, wherein n has a value between 1 and N, inclusive, comprises hardware and software that continually measures the atmospheric pressure (i.e., provides a measurement of barometric pressure at an outdoor location) and transmits those measurements to server computer 501. Pressure reference 502-*n* is at a known location in geographic region 120 and known elevation, and measures barometric pressure at an outdoor location, thereby not being subject to any stack effect.

In accordance with the illustrative embodiment, pressure reference 502-*n* is part of a personal weather station within a pressure reference network of personal weather stations (e.g., PURPLEAIR network, WEATHER UNDERGROUND network, etc.) or other stations having similar characteristics. A personal weather station comprises weather measuring instruments and is operated by a private individual, club, association, or business, typically in which obtaining and distributing weather data is not a part of the entity's primary business operation. In some other embodiments of the present invention, pressure reference 502-*n* is part of a different type of station than a personal weather station.

In still some alternative embodiments, second pressure reference network 150 comprises one or more pressure references that are at wireless terminals, such as wireless terminals 102 and 103. In this case, wireless terminals 102 and 103 each comprises hardware and software that continually measures the atmospheric pressure (i.e., provides a measurement of barometric pressure at an outdoor location) and transmits those measurements to server computer 501. Alternatively, location engine 113 provides the function of generating one or more estimates of reference pressure based on pressure measurements from wireless terminals.

When it takes a barometric pressure measurement as part of a pressure reference network, wireless terminal 102 or 103 is at a known location in geographic region 120 and known elevation. In some embodiments of the present invention, wireless terminal 102 or 103 is known to be at an outdoor location, measuring the barometric pressure at the outdoor location, and thereby not being subject to any stack effect. It will be clear to those skilled in the art, after reading this disclosure, how to make and use embodiments of the present invention in which wireless terminals are the only type of pressure reference within the second pressure reference network or, more specifically, wireless terminals of a specific make and/or model are the only type of pressure reference within the second network.

It will be clear to those skilled in the art how to make and use embodiments of the present invention that comprise any number of pressure references 502 within second pressure reference network 150 that is capable of providing a representative measurement of barometric pressure corresponding to a specified location with region 120.

First pressure reference network 140 in FIG. 4 and second pressure reference network 150 in FIG. 5 have different characteristics with respect to each other. The characteristics of each pressure reference network are determined, at least in part, by their constituent pressure references. Pressure reference 402-*m* within network 140 provides a relatively accurate barometric pressure measurement, while pressure reference 502-*n* within network 150 provide a relatively biased barometric pressure measurement. In other words, the measurement accuracy of pressure reference 402-*m* is better than the measurement accuracy of pressure reference 502-*n*.

Each pressure reference 402-*m* within first pressure reference network 140 makes each pressure measurement available after a relatively long delay (e.g., 5-minute delay, 10-minute delay, etc.) from the time to which the measurement corresponds, while each pressure reference 502-*n* within second pressure reference network 150 makes each pressure measurement available after a relatively short delay (e.g., less than 10-second delay, etc.). Consequently, first pressure reference network 140 makes each estimate of reference pressure available after a relatively long delay from the time to which at least some of the constituent reference pressure measurements correspond, while second pressure reference network 150 makes each estimate of reference pressure available after a relatively short delay. In other words, the delay between (i) when pressure reference 502-*n* makes a pressure measurement and (ii) when an estimate of reference pressure based on said pressure measurement is made available to location engine 113, is less than the delay between (i) when pressure reference 402-*m* makes a pressure measurement and (ii) when an estimate of reference pressure based on said pressure measurement is made available to location engine 113.

Each pressure reference 402-*m* within first pressure reference network 140 makes each pressure measurement available relatively infrequently (e.g., 10 minutes between estimates, 20 minutes between estimates, etc.), while each pressure reference 502-*n* within second pressure reference network 150 makes each pressure measurement available relatively frequently (e.g., less than 1 minute between estimates, etc.). Consequently, first pressure reference network 140 makes its estimates of reference pressure available relatively infrequently, while each pressure reference 502-*n* within second pressure reference network 150 makes its estimates of reference pressure available relatively frequently. In other words, successive new estimates of reference pressure made available by second pressure reference network 150 are more closely spaced in time than successive new estimates made available by first pressure reference network 140.

A particular type of pressure reference 502-*n* is selected to be used within second pressure reference network 150 based on a predetermined characteristic of pressure measurement of the pressure reference. For example, although a personal weather station or a wireless terminal provides, in some embodiments, a relatively biased barometric pressure measurement compared with an airport station, the amount of bias stays relatively constant across a range of pressure measurements (e.g., less than 5 percent variation across the range, etc.). Thus, such stations can be used in second pressure reference network 150 because of the consistency in pressure measurement bias over a range of pressure measurements. Also, the pressure measurement bias of stations within network 150 might still experience drift over time (e.g., in a random direction over a longer period of time). However, the drift is sufficiently small over the time period in which more than one reference pressure estimate from the more-accurate network 140 is made available.

Operation of the Illustrative Embodiment—FIG. 6 depicts a flowchart of the salient processes performed as part of method 600, in accordance with the illustrative embodiment of the present invention. Method 600 can be used to generate an enhanced estimate of reference barometric pressure and to generate an estimate the elevation of wireless terminal 101 based in part on the enhanced estimate of reference barometric pressure. As those who are skilled in the art will appreciate, after reading the present disclosure, method 600 can be applied to a different wireless terminal, or terminals, than wireless terminal 101.

It will be clear to those having ordinary skill in the art, after reading the present disclosure, how to make and use alternative embodiments of method 600, and also of the other methods disclosed in this disclosure, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, terminal 102, terminal 103, etc.). Furthermore, at least some of the operations disclosed as being performed by server computer 401 and/or 501 can be performed by location engine 113.

In the disclosure that follows, the following times and corresponding events are used for illustrative purposes:

i. The time that a first estimate of reference barometric pressure made by first pressure network 140 corresponds to is $t_1$, and ii. The time that a second estimate of reference barometric pressure made by second pressure network 150 corresponds to is $t_2$, and iii. The time that a third estimate of reference barometric pressure made by second pressure network 150 corresponds to is $t_3$, wherein time $t_3$ is later than time $t_2$, and iv. The time that a measurement of barometric pressure made by wireless terminal 101 corresponds to is $t_4$.

For illustrative purposes, each estimate or measurement listed above corresponds to a respective time in the sense that the estimate or measurement is most relevant at that particular time. The system that makes the estimate or measurement identifies it, or otherwise represents it, as corresponding to that particular time. As those who are skilled in the art will appreciate, however, after reading this disclosure, each of the aforementioned times can signify, in some alternative embodiments of the present invention, the time at which the corresponding estimate or measurement becomes available to another entity (e.g., location engine 113, etc.) requesting it or using it.

In accordance with operation 601, GIS database 321 and pressure reference network database 322 are constructed and stored in memory 303 of location engine 113. Operation 601 is described in detail below and in FIG. 7.

In accordance with operation 603, location engine 113 obtains a lateral location estimate of wireless terminal 101. In some embodiments of the present invention, the time that the lateral location estimate of wireless terminal 101 corresponds to is $t_4$. Operation 603 is described in detail below and in FIG. 11.

In accordance with operation 605, location engine 113 obtains a measurement of barometric pressure made by wireless terminal 101 and corresponding to time $t_4$. In some embodiments of the present invention, location engine 113 can also obtain measurements of temperature and/or humidity from wireless terminal 101. Operation 605 is described in detail below and in FIG. 12.

In accordance with operation 607, location engine 113 generates an enhanced estimate of reference barometric pressure based on:
i. a first estimate of reference barometric pressure corresponding to time $t_1$, made available by first reference network 140, and
ii. a second estimate of reference barometric pressure corresponding to time $t_2$, made available by second reference network 150, and
iii. a third estimate of reference barometric pressure corresponding to time $t_3$, made available by second reference network 150.

Operation 607 is described in detail below and in FIG. 13.

In accordance with operation 609, location engine 113 generates an estimate of the elevation of wireless terminal 101 based on:
i. the enhanced estimate of reference barometric pressure derived from the two reference networks, generated in accordance with operation 607, and
ii. a measurement of barometric pressure made by wireless terminal 101, obtained in accordance with operation 605.

In some embodiments of the present invention, the time that the estimate of the elevation corresponds to is $t_4$. Operation 609 is described in detail below and in FIG. 15.

In accordance with operation 611, location engine 113 transmits:
i. the estimate of the lateral location of wireless terminal 101 obtained in accordance with operation 603, and/or
ii. the measurement of barometric pressure made by wireless terminal 101, obtained in accordance with operation 605, and/or
iii. the enhanced estimate of reference barometric pressure generated in accordance with operation 607, and/or
iv. the estimate of the elevation of wireless terminal 101 generated in accordance with operation 609,
to location-based application server 112 and/or to wireless terminal 101 and/or 102 and/or 103 for use in a location-based application.

In some embodiments of the present invention, location engine 113 displays (e.g., on a display, etc.) the estimate of lateral location and/or measurement of terminal barometric pressure and/or estimate of enhanced reference barometric pressure and/or estimate of elevation, instead of or in addition to transmitting them. It will be clear to those skilled in the art how to make and use embodiments of the present invention that perform operation 611.

After operation 611 is completed, location engine 113 can repeat at least some of the operations depicted in FIG. 6.

Figure 7:
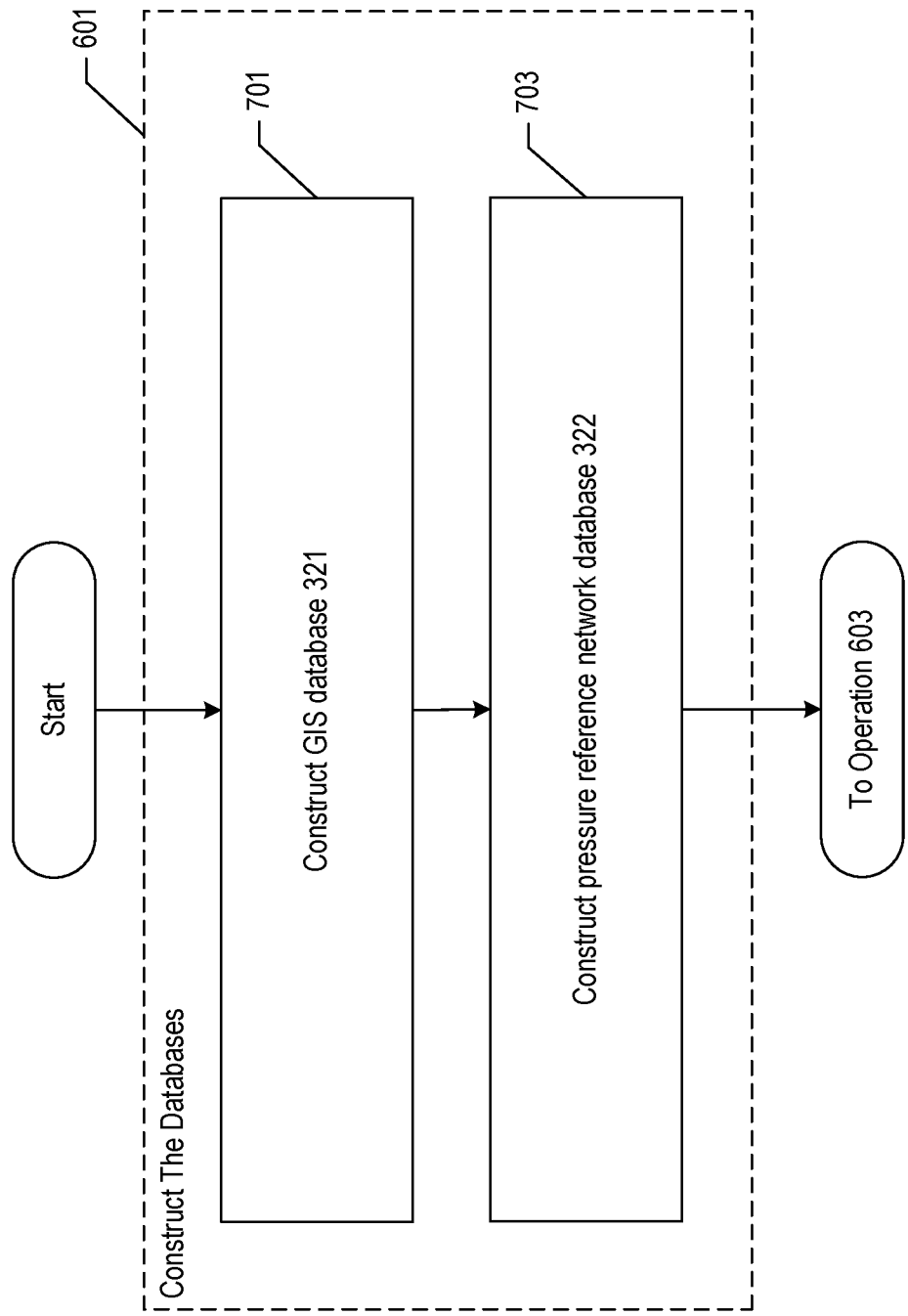
FIG. 7 depicts a flowchart of the salient processes performed in accordance with operation 601 of method 600.

Initialize the Databases—FIG. 7 depicts a flowchart of the salient processes performed in accordance with operation 601.

Figure 8:
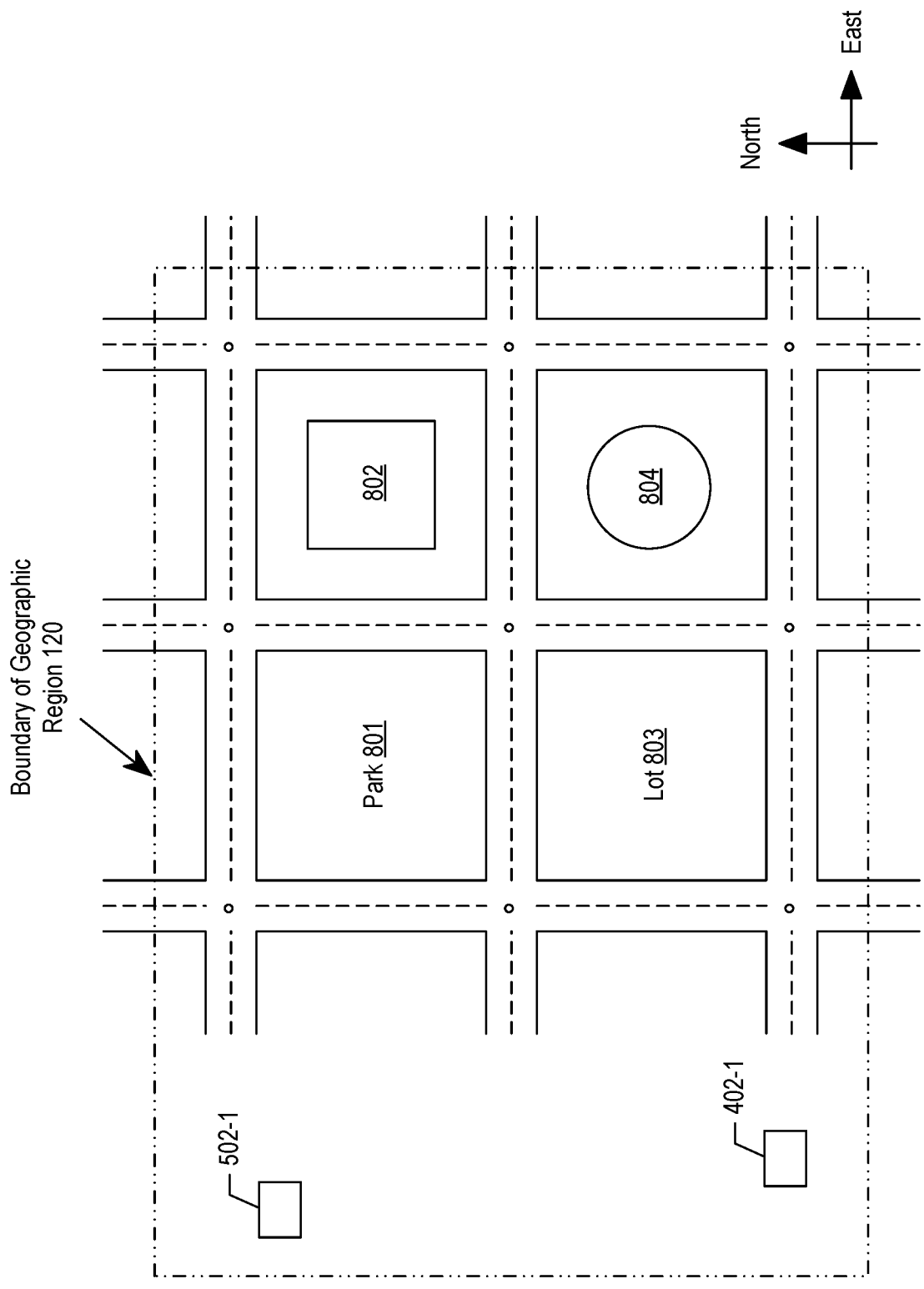
FIG. 8 depicts a map that is made of geographic region 120.

At operation 701, GIS database 321 is constructed and stored in memory 303 of location engine 113. As part of operation 701, geographic region 120 is delimited and surveyed. FIG. 8 depicts a detailed map that is made of geographic region 120, which spans approximately four city blocks and comprises, among other things, park 801, boxy building 802, empty lot 803, and cylindrical building 804, first pressure reference 402-1 and second pressure reference 502-1. It will be clear to those skilled in the art, after reading this disclosure, how to make and use alternative embodiments of the present invention that comprise any area of any shape, any geographic features, any population density and development, any number, size, height, and shape of structures, and any number of pressure references.

In accordance with the illustrative embodiment, geographic region 120 is flat, level, and at an elevation of 1000 meters, a known elevation. It will be clear to those skilled in the art, however, after reading this disclosure, how to make and use alternative embodiments of the present invention in which geographic region 120 is not flat, not level, and/or is at a different elevation.

Figure 9:
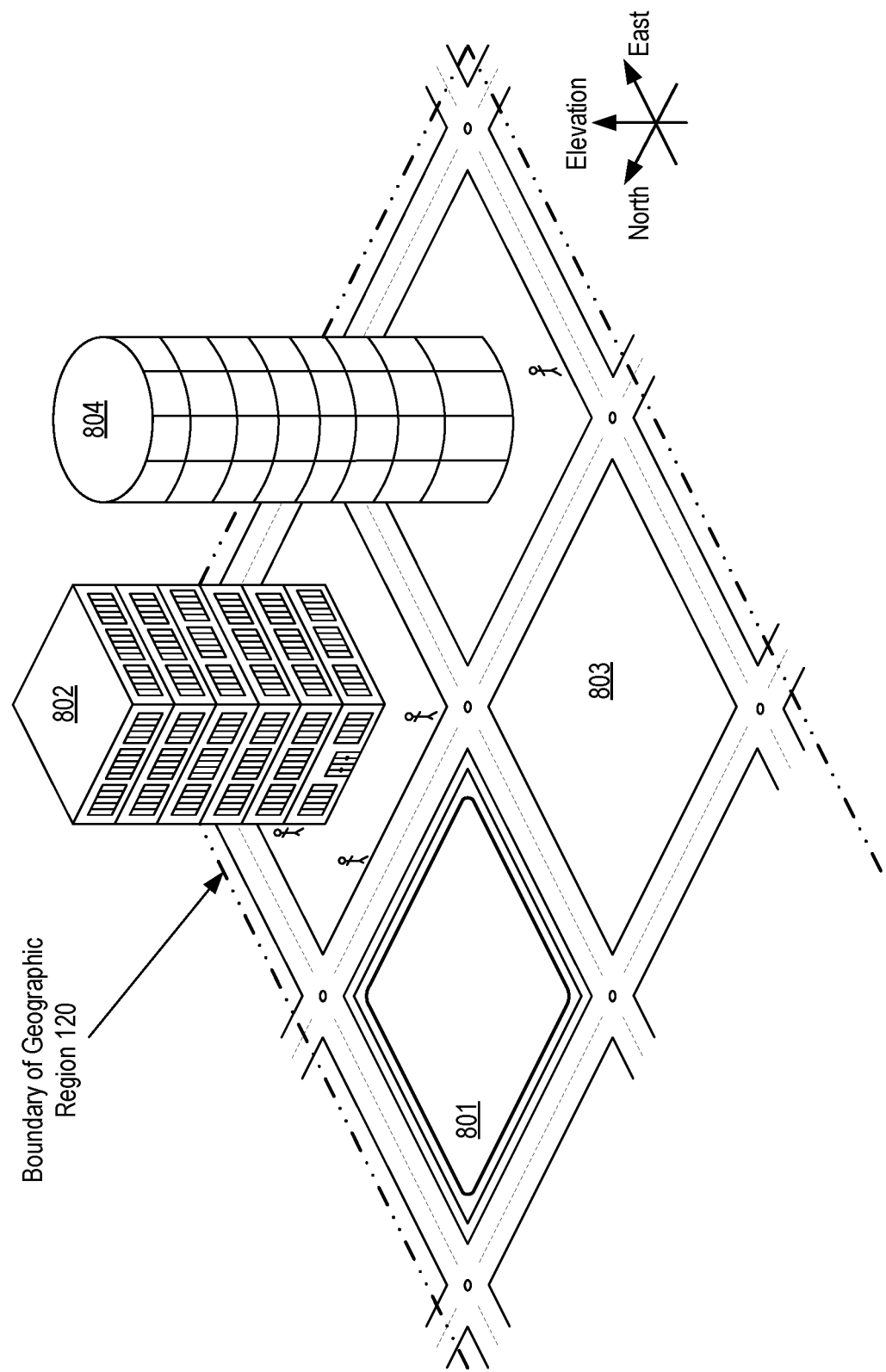
FIG. 9 depicts a survey of the ground level of geographic region 120.

In accordance with the illustrative embodiment, geographic region 120 is square and comprises approximately four city blocks of an urban environment. As part of operation 601, a detailed survey of the ground level of geographic region 120 is made, as shown in FIG. 9.

Figure 10:
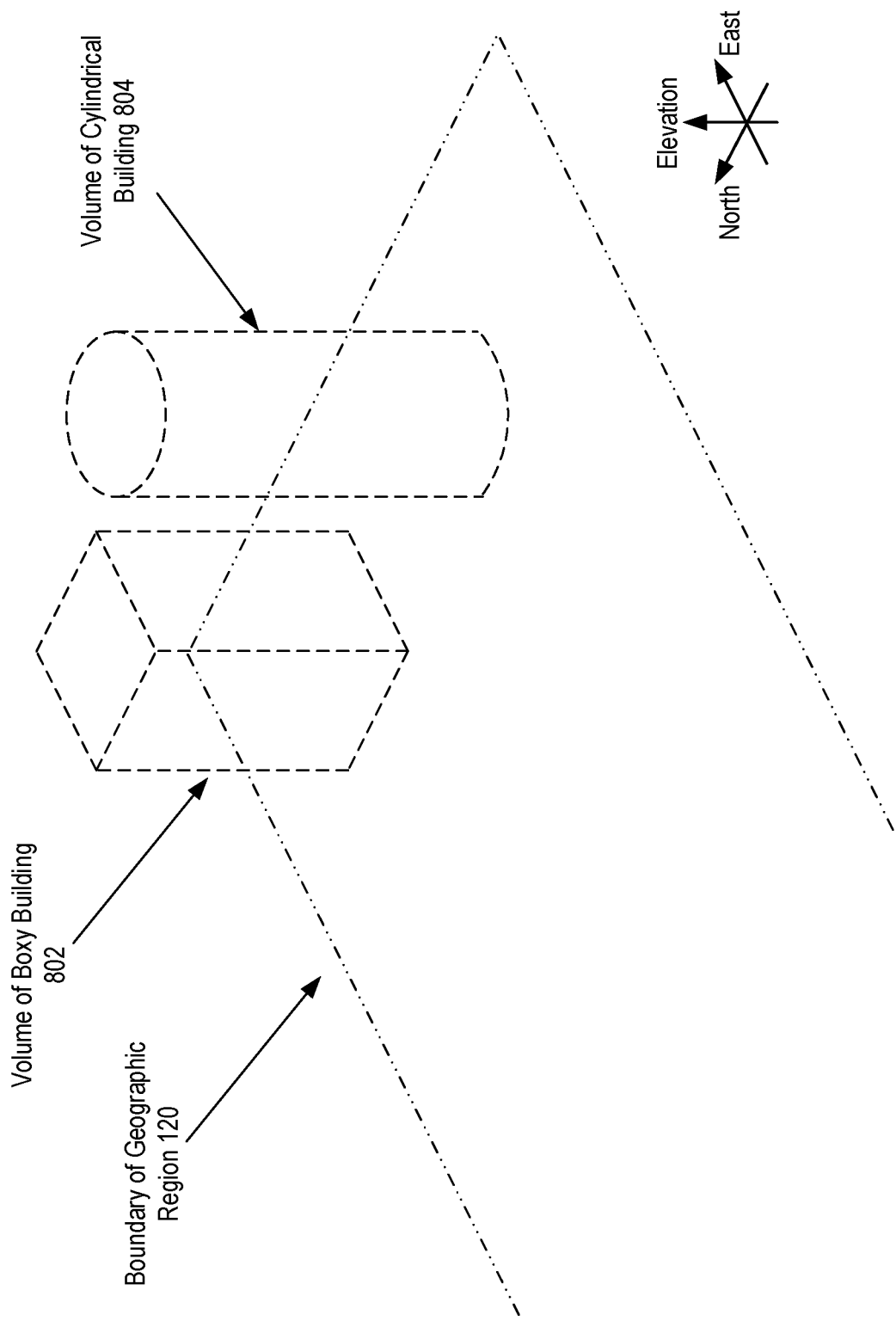
FIG. 10 depicts a three-dimensional survey of geographic region 120.

In accordance with the illustrative embodiment, as part of operation 601, the coordinate positions of the various features of one or more objects (e.g., buildings, structures, etc.) in geographic region 120 are determined and stored in GIS database 321. The positions of one or more features of the objects can be determined by referencing the three-dimensional survey of geographic region 120, which is depicted in FIG. 10. In some embodiments of the present invention, the objects can be represented in a different way (e.g., vector-based, etc.).

At operation 703, pressure reference network database 322 is constructed and stored in memory 303 of location engine 113. The pressure reference network includes information such as, but not limited to, information used to access each pressure reference network and the characteristics of each pressure reference network. The characteristics include the measurement accuracy of the pressure references in the pressure reference network, such as the accuracies of pressure references 402-1 and 502-1 depicted in FIG. 8, the update rate associated with the network, and the delay associated with each pressure measurement associated with the network. In some embodiments of the present invention, database 322 is used to store estimates of reference pressure received from each pressure reference network, along with relevant information (e.g., time of estimate, elevation of estimate, etc.).

Figure 11:
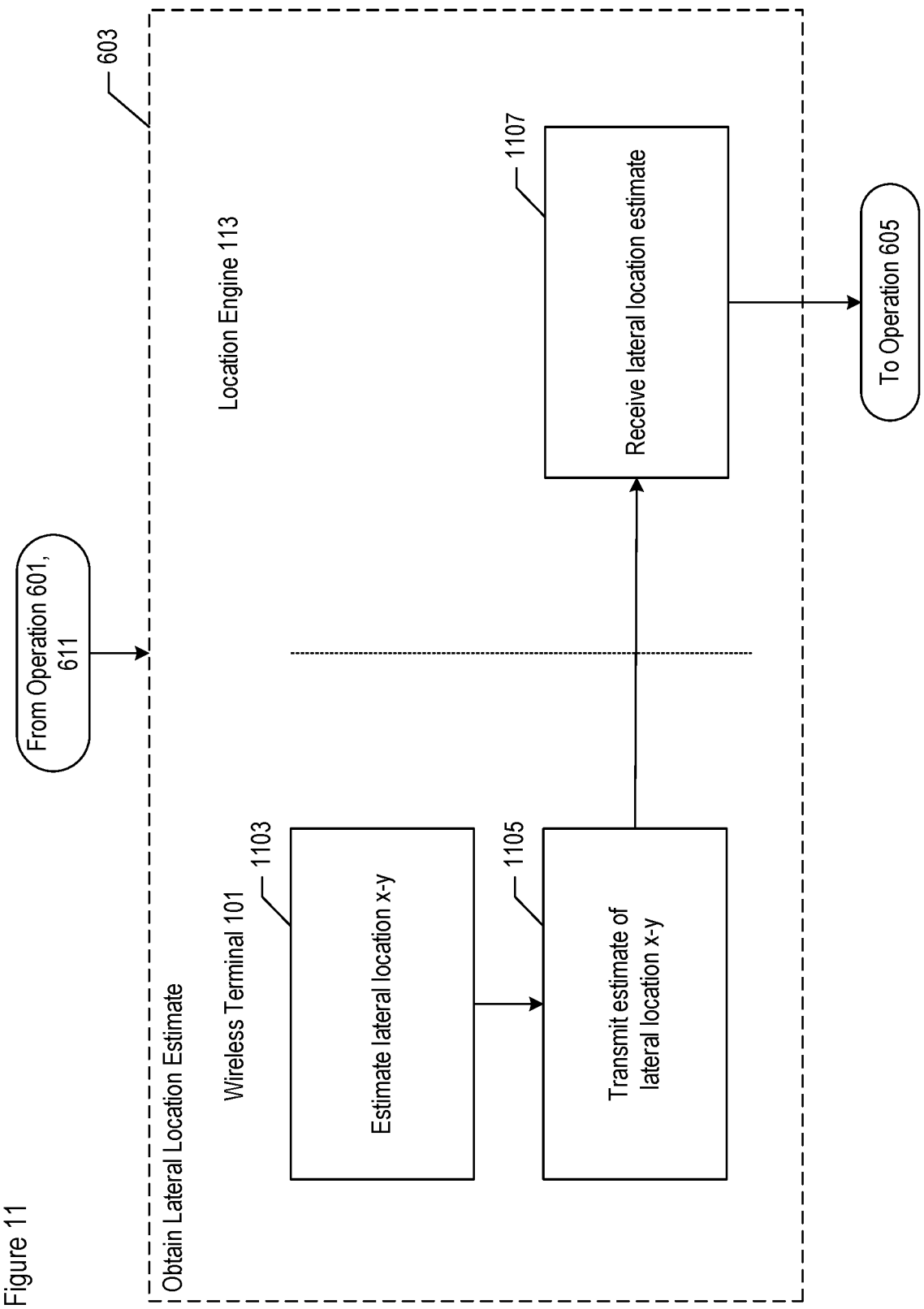
FIG. 11 depicts a flowchart of the salient processes performed in accordance with operation 603 of method 600.

Obtain Lateral Location Measurements—FIG. 11 depicts a flowchart of the salient processes performed in accordance with operation 603.

At operation 1103, based on signals it receives from satellite constellation 131, wireless terminal 101 generates a lateral location estimate of terminal 101's location x-y.

At operation 1105, wireless terminal 101 transmits the lateral location estimate of terminal 101's location x-y.

At operation 1107, location engine 113 receives the lateral location estimate transmitted by wireless terminal 101 at operation 1105.

In some embodiments of the present invention, location engine 113 estimates lateral location x-y based on measurements of one or more location-dependent traits of radio signals described elsewhere in this disclosure, either in addition to or instead of the GPS-based estimate. It will be clear to those skilled in the art how to make and use embodiments of the present invention to estimate lateral location x-y based on one or more location-dependent traits. See for example and without limitation, U.S. Pat. Nos. 6,944,465, 7,460,505, 7,383,051, 7,257,414, 7,753,278, 7,433,695, 7,848,762, and 8,630,665, each of which are incorporated by reference.

At least some of operations 1103 through 1107 can be performed continuously, concurrently, and/or asynchronously. Wireless terminals 102 and 103 can similarly generate and provide to location engine 113 their lateral location estimates.

Figure 12:
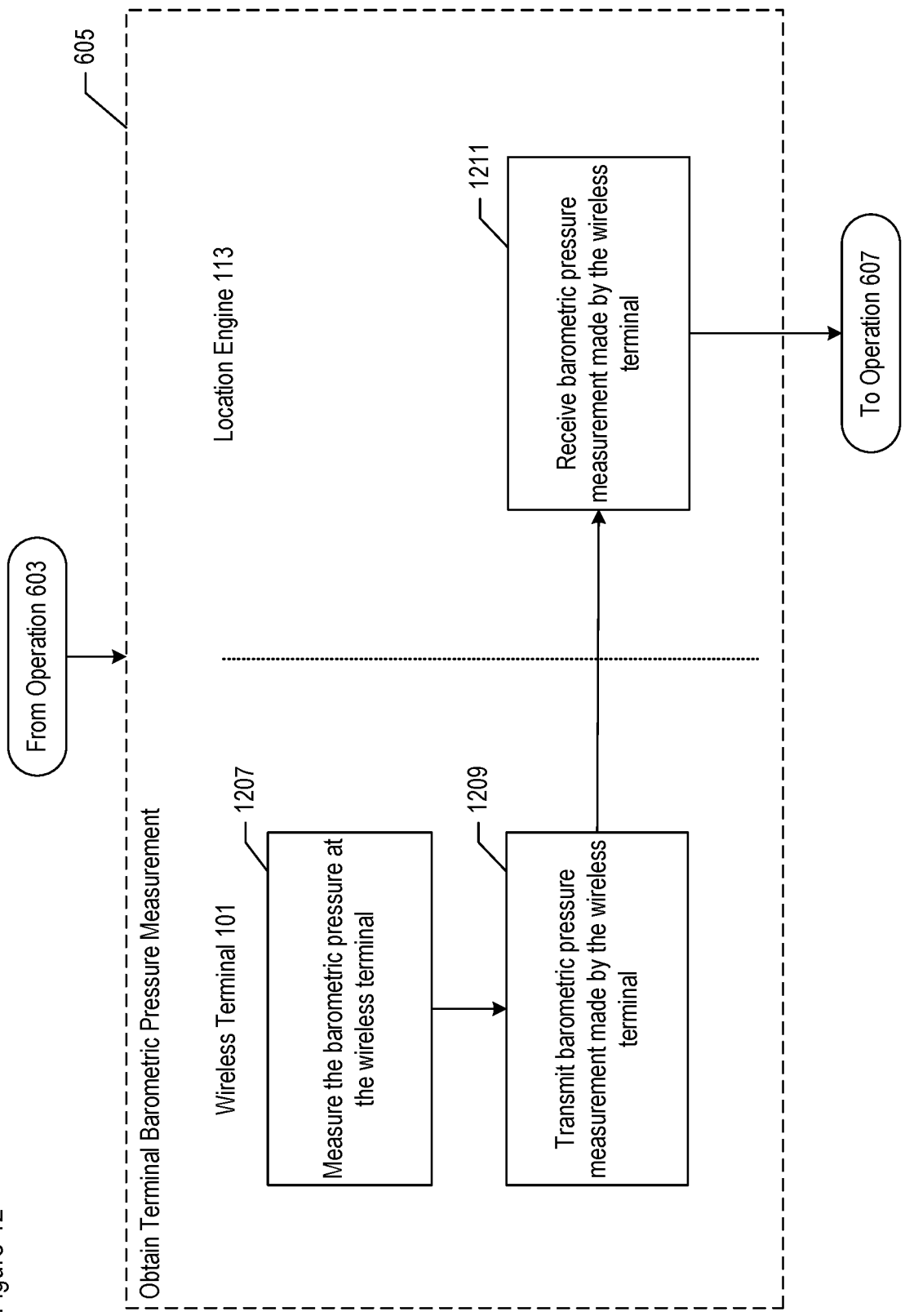
FIG. 12 depicts a flowchart of the salient processes performed in accordance with operation 605 of method 600.

Obtain Wireless Terminal Pressure Measurements—FIG. 12 depicts a flowchart of the salient processes performed in accordance with operation 605.

In accordance with operation 1207, wireless terminal 101 samples barometric pressure in its vicinity by using its barometer 205, in order to form measurements. In some embodiments of the present invention, each measurement represents one sampling of barometric pressure, while in some other embodiments each measurement comprises more than one sampling of barometric pressure. In accordance with the illustrative embodiment, a sample of barometric pressure is taken once per second, but it will be clear to those skilled in the art how to make and use alternative embodiments of the present invention that take the samples at a different rate (e.g., 5 per second, 10 per second, etc.).

In accordance with operation 1209, wireless terminal 101 transmits measurements of barometric pressure, $P_{MEAS}$, to location engine 113, as derived from one or more samples from operation 1207. In accordance with the illustrative embodiment, operation 1209 is performed every 5 seconds, but it will be clear to those skilled in the art how to make and use alternative embodiments of the present invention that transmit the measurements of barometric pressure at other times.

In accordance with operation 1211, location engine 113 receives the barometric pressure measurements transmitted in accordance with operation 1209. In some embodiments of the present invention, location engine 113 combines the values of multiple pressure measurements (e.g., by calculating a median, etc.) in order to reduce measurement noise.

At least some of operations 1207 through 1211 can be performed continuously, concurrently, and/or asynchronously. Wireless terminals 102 and 103 can similarly make and provide to location engine 113 their barometric pressure measurements.

Figure 13:
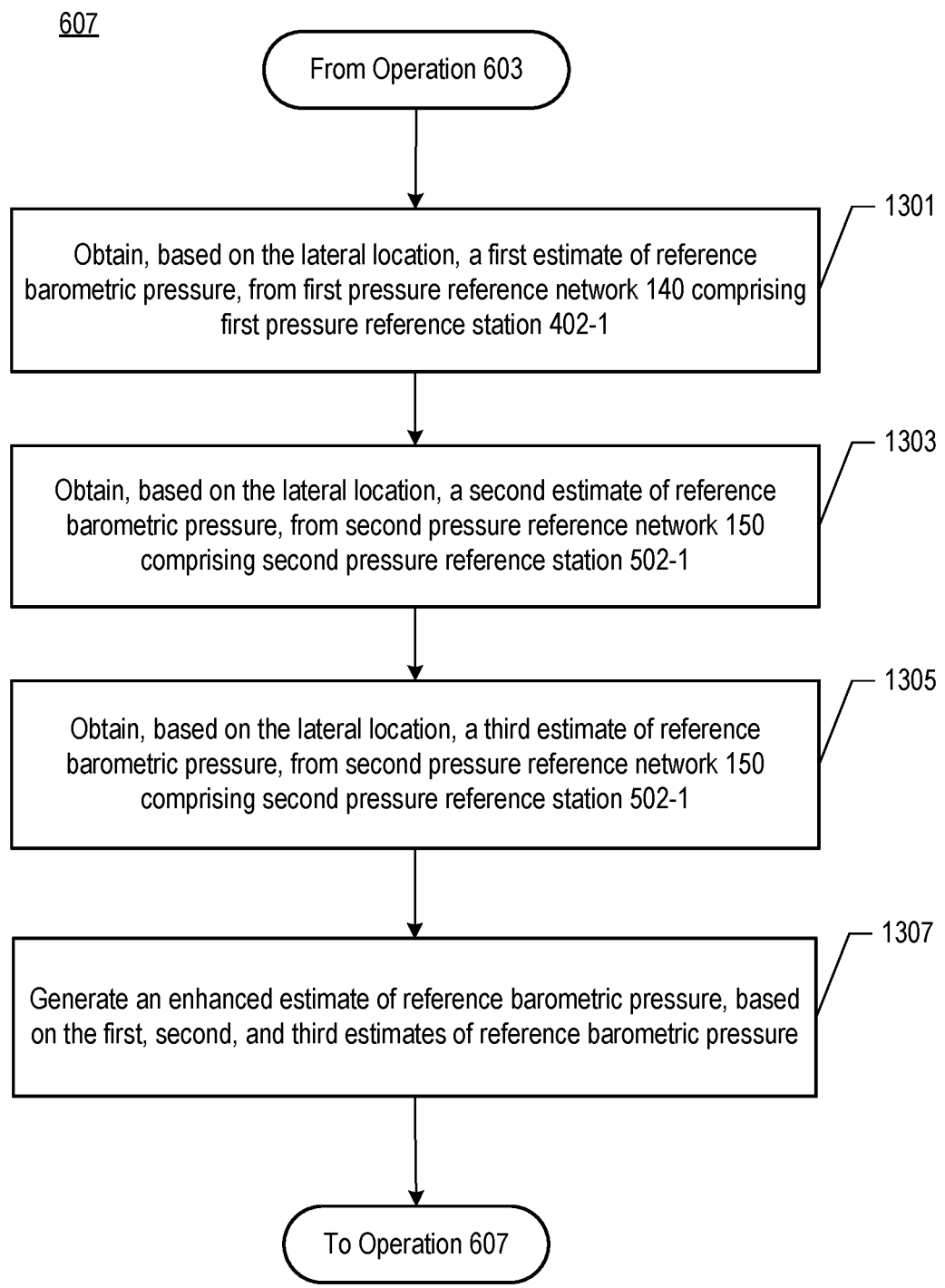
FIG. 13 depicts a flowchart of the salient processes performed in accordance with operation 607 of method 600.

Generate Enhanced Estimate of Reference Barometric Pressure—FIG. 13 depicts a flowchart of the salient processes performed in accordance with operation 607.

In accordance with operation 1301, location engine 113 obtains, based on the lateral location of wireless terminal 101 obtained in operation 603, a first estimate of reference barometric pressure. Location engine 113 obtains the first estimate from server computer 401 of first pressure reference network 140 and is one of a series of estimates obtained from network 140. As explained below and in FIG. 14, network 140 generates the first estimate based on pressure measurements made by one or more pressure references 402 in network 140, including a measurement of barometric pressure made by pressure reference 402-1.

The first estimate of reference barometric pressure made available by network 140 corresponds to time $t_1$. Time $t_1$ might be earlier than the time at which location engine 113 queries network 140 for the estimate or the time at which location engine 113 receives the estimate. Location engine 113 might receive the estimate because it requested it or because network 140 autonomously provides it.

In accordance with operation 1303, location engine 113 obtains, based on the lateral location of wireless terminal 101 obtained in operation 603, a second estimate of reference barometric pressure. Location engine 113 obtains the second estimate from server computer 501 of second pressure reference network 150 and is one of a series of estimates obtained from network 150. Similar to how server computer 401 within network 140 generates its reference estimates in FIG. 14, server computer 501 within network 150 generates the second estimate based on pressure measurements made by one or more pressure references 502 in network 150, including a measurement of barometric pressure made by pressure reference 502-1.

The second estimate of reference barometric pressure made available by network 150 corresponds to time $t_2$. Time $t_2$ might be earlier than the time at which location engine 113 queries network 150 for the estimate or than the time at which location engine 113 receives the estimate. Location engine 113 might receive the estimate because it requested it or because network 150 autonomously provides it.

In some embodiments of the present invention, location engine 113 queries network 150 for the second estimate of reference barometric pressure, based on when the first estimate of reference barometric pressure is made available by first pressure network 140 or the time to which the first estimate corresponds (i.e., time $t_1$). In other words, a second estimate is obtained or selected to be used, or both, that corresponds to a time (i.e., time $t_2$) that is based on time $t_1$, in that it is close to, if not the same as, time $t_1$.

In accordance with operation 1305, location engine 113 obtains, based on the lateral location of wireless terminal 101 obtained in operation 603, a third estimate of reference barometric pressure. Location engine 113 obtains the third estimate from server computer 501 of second pressure reference network 150 and is one of a series of estimates obtained from network 150. Similar to how server computer 401 within network 140 generates its reference estimates in FIG. 14, server computer 501 within network 150 generates the third estimate based on pressure measurements made by one or more pressure references 502 in network 150, including a measurement of barometric pressure made by pressure reference 502-1.

The third estimate of reference barometric pressure made available by network 150 corresponds to time $t_3$. Time $t_3$ might be earlier than the time at which location engine 113 queries network 150 for the estimate or than the time at which location engine 113 receives the estimate. Location engine 113 might receive the estimate because it requested it or because network 150 autonomously provides it.

In some embodiments of the present invention, location engine 113 queries network 150 for the third estimate of reference barometric pressure, based on when the measurement of barometric pressure is made by wireless terminal 101 (i.e., at time $t_4$), as part of operation 605. In other words, a third estimate is obtained or selected to be used, or both, that corresponds to a time (i.e., time $t_3$) that is based on time $t_4$, in that it is close to, if not the same as, time $t_4$.

In accordance with operation 1307, location engine 113 generates an enhanced estimate of reference barometric pressure, $P_W$, based on:

i. the first estimate of reference barometric pressure, and ii. the second estimate of reference barometric pressure, and iii. the third estimate of reference barometric pressure.

In some embodiments of the present invention, the time that the enhanced estimate of reference barometric pressure corresponds to is $t_4$.

In accordance with the illustrative embodiment, the enhanced estimate of reference barometric pressure, $P_W$, is determined as follows:

$$P_W = P_{t1} + (P_{t3} - P_{t2}), \quad \text{(Eq. 2)}$$

wherein:

$P_{t1}$ is the first estimate of reference barometric pressure from operation 1301, $P_{r2}$ is the second estimate of reference barometric pressure from operation 1303, and $P_{r3}$ is the third estimate of reference barometric pressure from operation 1305.

As those who are skilled in the art will appreciate after reading this disclosure, in some alternative embodiments $P_W$ can be determined using a different equation than that described above. For example and without limitation, a difference between $P_{r1}$ and $P_{r2}$ can be determined at any time after both $P_{r1}$ and $P_{r2}$ are made available (e.g., one hour ago from a present time, etc.), and then $P_{r3}$ can be added to said difference after $P_{r3}$ is made available (e.g., at the present time, etc.).

As mentioned earlier, first pressure reference network 140 and second pressure network 150 can have different characteristics. In accordance with the illustrative embodiment, the advantages of each network are combined in generating the enhanced estimate of reference pressure, $P_W$. For example and without limitation, location engine 113 generates the second and third estimates of reference barometric pressure using one or more pressure references 502 having a high consistency of pressure measurement bias across different measurement levels and across times $t_2$ and $t_3$. Accordingly, any bias in barometric pressure measurement is substantially canceled out when the difference between the second and third estimates of reference barometric pressure (i.e., $P_{r2}$ and $P_{r3}$, respectively) is used. And knowing that the bias can be substantially canceled out, $P_{r2}$ and $P_{r3}$ can be combined with $P_{r1}$, which is relatively accurate albeit delayed, in order to make $P_{r1}$ current.

Location engine 113 also generates an elevation, $Z_W$, corresponding to the enhanced estimate of reference barometric pressure, $P_W$. $Z_W$ is based on the elevations corresponding to the first, second, and third estimates of reference barometric pressure.

Figure 14:
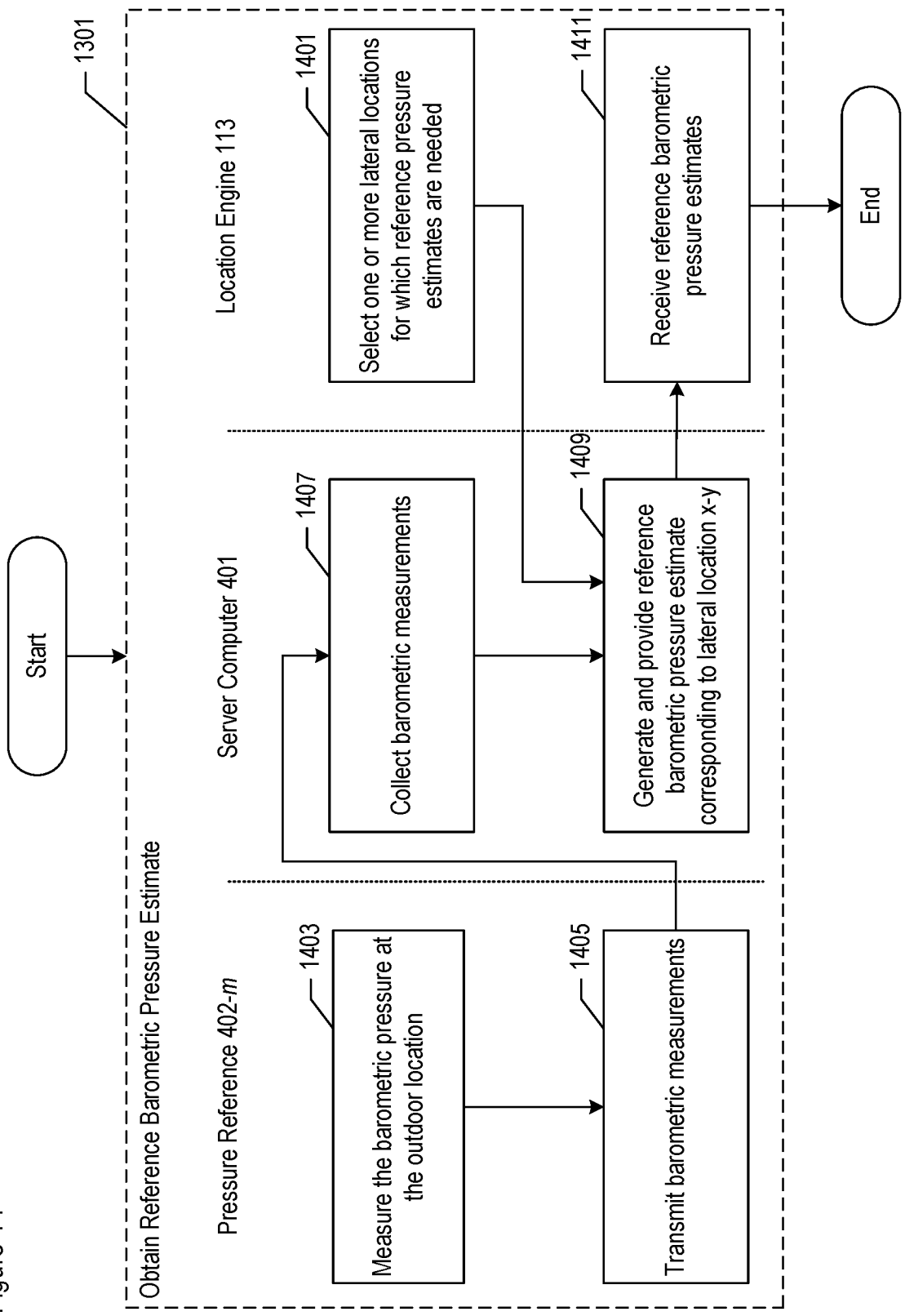
FIG. 14 depicts a flowchart of the salient processes performed in accordance with obtaining a reference barometric pressure estimate, as part of operation 607.

Obtain Reference Pressure Estimate—FIG. 14 depicts a flowchart of the salient processes performed in accordance with obtaining a reference barometric pressure estimate from a pressure reference network. For illustrative purposes, the operations described below are for obtaining a reference pressure estimate from network 140, as in operation 1301. However, as those who are skilled in the art will appreciate after reading this disclosure, the operations depicted in FIG. 14 can be adapted to obtain, corresponding to one or more times, reference pressure estimates from network 150 as well.

In accordance with operation 1401, location engine 113 selects one or more lateral locations for which reference pressure estimates are required, including lateral location x-y for wireless terminal 101 obtained at operation 603, and provides the lateral location(s) to server computer 401. Meanwhile, server computer 401 has been collecting barometric pressure measurements made by pressure reference stations 402-1 through 402-M at one or more times, and generating estimates as explained below.

In accordance with operation 1403, each pressure reference 402-m samples barometric pressure in its vicinity, in order to form measurements. In some embodiments of the present invention, each measurement represents one sampling of barometric pressure, while in some other embodiments each measurement comprises more than one sampling of barometric pressure.

In accordance with operation 1405, each pressure reference 402-m transmits a measurement of atmospheric pressure from operation 1403—that is, provides a measurement of barometric pressure at an outdoor location—server computer 401. In accordance with the illustrative embodiment, operation 1405 is performed every 10 minutes, but it will be clear to those skilled in the art how to make and use alternative embodiments of the present invention that transmit the measurements at other rates.

In accordance with operation 1407, server computer 401 collects and stores, for later use, barometric pressure measurements received from one or more pressure references 402.

In accordance with operation 1409, server computer 401 generates, from the barometric pressure measurements collected at operation 1407, a reference barometric pressure estimate that corresponds to lateral location x-y provided by location engine 113 at operation 1401. Server computer 401 also determines i) the time to which the estimate of reference barometric pressure corresponds and ii) the estimated reference elevation corresponding to the estimate of reference pressure. Server computer 401 has access to multiple pressure references 402-1 through 402-M within first pressure reference network 140.

In some embodiments of the present invention, server computer 401 uses i) the most recent measurement or measurements received from a single pressure reference 402-m and ii) the elevation of said pressure reference, as the estimate of reference pressure and corresponding elevation, respectively. For example and without limitation, the pressure reference 402-m that is the closest in distance to the lateral location provided by location engine 113 can be used.

In some other embodiments of the present invention, based on lateral location x-y provided by location engine 113, server computer 401 synthesizes (e.g., via interpolation, etc.) an estimate of reference barometric pressure from one or more reference pressure measurements, from each of more than one pressure reference (e.g., station 402-1, station 402-2, etc.). In doing so, server computer 401 takes into account the lateral locations and elevations of the applicable pressure reference stations, in relation to the lateral location provided by location engine 113. Server computer 401 generates the most recent estimate that it can of reference pressure and corresponding elevation based on the collected pressure measurements that it has.

In still some other embodiments of the present invention, based on lateral location x-y provided by location engine 113, server computer 401 synthesizes (e.g., via interpolation, etc.) an estimate of reference barometric pressure that corresponds to a specified time or times. For example and without limitation, the time or times of interest can be specified by location engine 113.

In accordance with operation 1411, location engine 113 receives the reference barometric pressure estimate from server computer 401. In some embodiments of the present invention, location engine 113 also receives the time to which the estimate of reference barometric pressure corresponds and the estimated reference elevation corresponding to the estimate of reference pressure.

At least some of operations 1401 through 1411 can be performed continuously, concurrently, and/or asynchronously.

Figure 15:
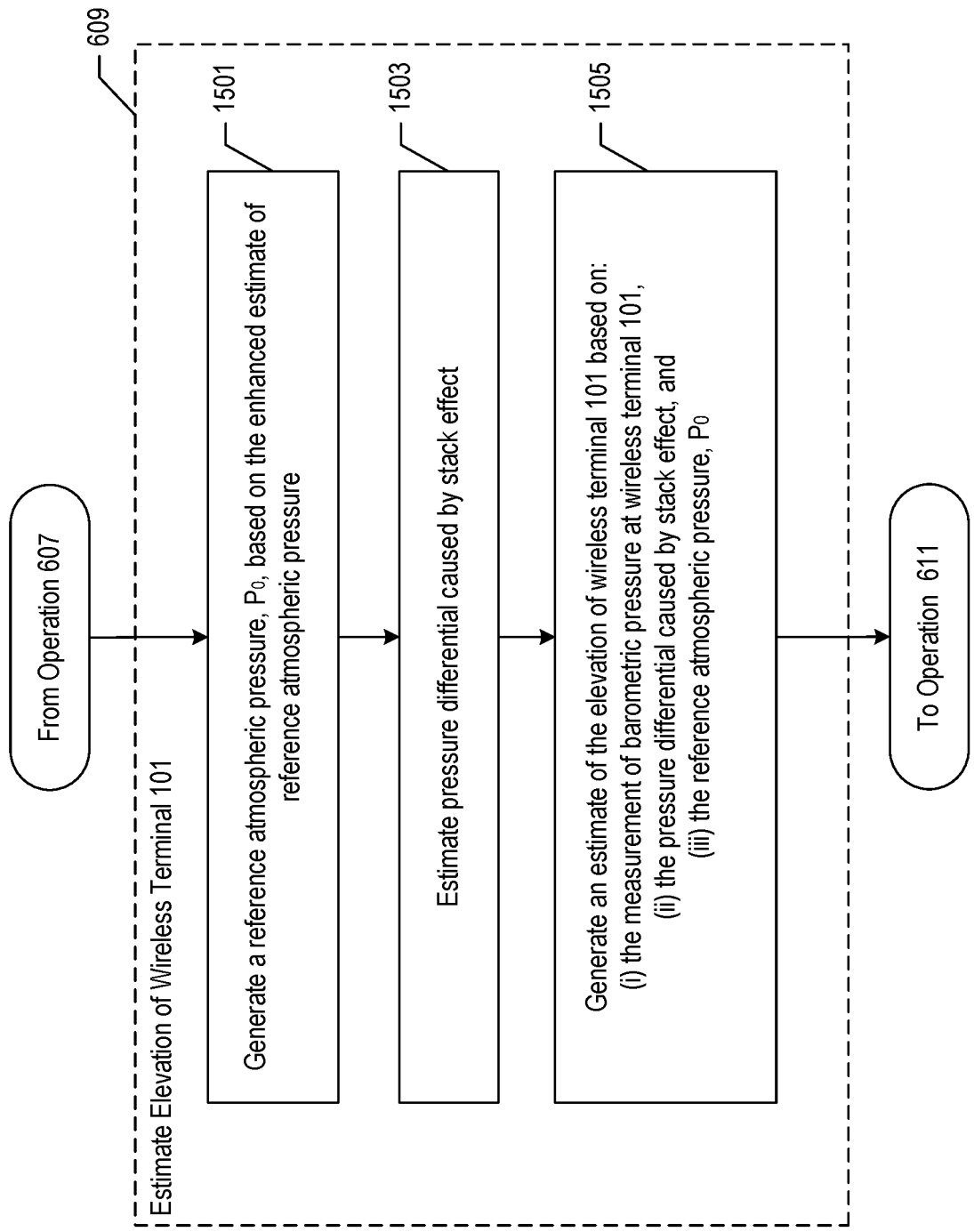
FIG. 15 depicts a flowchart of the salient processes performed in accordance with operation 609 of method 600.

Estimate the Elevation of Wireless Terminal 101—FIG. 15 depicts a flowchart of the salient processes performed in accordance with operation 609.

At operation 1501, location engine 113 generates $P_O$, which is an estimate of the reference atmospheric pressure for the lateral location that corresponds to the location for which the elevation of wireless terminal is being estimated and within geographic location 120, based on:

$$P_0 = \frac{P_W}{e^{-\left(\frac{Z_W}{H}\right)}} \quad \text{(Eq. 3)}$$

wherein:
- $P_W$ is the enhanced estimate of reference barometric pressure generated in accordance with operation 607,
- $Z_W$ is the estimate of reference elevation generated in accordance with operation 607, and
- H is the scale height of the atmosphere, which is the elevation at which the atmospheric pressure has decreased to $e^{-1}$ times its value at mean sea level (e.g., approximately 7000 meters, etc.).

As those who are skilled in the art will appreciate after reading this disclosure, in some alternative embodiments $P_0$ can be determined using a different equation than that described above.

At operation 1503, location engine 113 generates an estimate of the pressure differential, $P_M$, based on a stack-effect compensation model. For details on a stack-effect compensation model, see for example and without limitation U.S. Pat. No. 9,237,423, which is incorporated by reference. In some scenarios, no stack effect is present. It will be clear to those skill in the art, after reading this disclosure, how to make and use embodiments of the present invention that perform operation 1503.

At operation 1505, location engine 113 generates an estimate of the elevation of wireless terminal 101, $Z_T$, based on:

$$Z_T = -H * \ln\left(\frac{P_T - P_M}{P_0}\right) \quad \text{(Eq. 4)}$$

wherein:
- H is the scale height of the atmosphere (described above),
- $P_T$ is the relevant measurement of atmospheric pressure received from wireless terminal 101 at operation 605,
- $P_M$ is the pressure differential determined in accordance with operation 1503, and
- $P_0$ is the reference atmospheric pressure determined in accordance with operation 1501.

In some embodiments of the present invention, $P_T$ is also adjusted by the barometric pressure measurement bias, if known, of wireless terminal 101.

As those who are skilled in the art will appreciate after reading this disclosure, in some alternative embodiments $Z_T$ can be determined using a different equation than that described above.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by a data processing system, a first estimate of reference barometric pressure made by a first pressure reference network and corresponding to a first lateral location, wherein the first pressure reference network identifies the first estimate as corresponding to time $t_1$, and wherein the first estimate of reference barometric pressure is based on i) the first lateral location and ii) a first measurement of barometric pressure made by a first pressure reference within the first pressure reference network;
   receiving, by the data processing system, a series of estimates of reference barometric pressure made by a second pressure reference network comprising a second pressure reference, wherein the series of estimates comprises:
   i) a second estimate of reference barometric pressure, wherein the second pressure reference network identifies the second estimate as corresponding to time $t_2$, and wherein the second estimate of reference barometric pressure is based on a second measurement of barometric pressure made by the second pressure reference, and
   ii) a third estimate of reference barometric pressure, wherein the second pressure reference network identifies the third estimate as corresponding to time $t_3$, and wherein the third estimate of reference barometric pressure is based on a third measurement of barometric pressure made by the second pressure reference,
   wherein the interval between time $t_2$ and time $t_3$ is less than the interval between i) time $t_1$ and ii) the time at which the next estimate of reference barometric pressure is made by the first pressure reference network after time $t_1$;
   receiving, by the data processing system, a fourth measurement of barometric pressure made by a first wireless terminal at time $t_4$ while at the first lateral location;
   generating an enhanced estimate of reference barometric pressure based on:
   i) the first estimate of reference barometric pressure corresponding to the first lateral location, and
   ii) a difference in amount between the second estimate of reference barometric pressure and the third estimate of reference barometric pressure; and
   generating an estimate of the elevation of the first wireless terminal based on:
   i) the fourth measurement of barometric pressure made by the first wireless terminal, and
   ii) the enhanced estimate of reference barometric pressure.

2. The method of claim 1, further comprising transmitting the estimate of elevation of the first wireless terminal to a location-based application server.

3. The method of claim 1, further comprising selecting, from the series of estimates of reference barometric pressure and based on time $t_1$, the second estimate of reference barometric pressure corresponding to time $t_2$ by the second pressure reference network, wherein the generating of the enhanced estimate is further based on the selecting of the second estimate of reference barometric pressure.

4. The method of claim 1, further comprising selecting, from the series of estimates of reference barometric pressure and based on time $t_4$, the third estimate of reference barometric pressure corresponding to time $t_3$ by the second pressure reference network, wherein the generating of the enhanced estimate is further based on the selecting of the third estimate of reference barometric pressure.

5. The method of claim 1, wherein the first pressure reference is an airport station.

6. The method of claim 1, wherein the second pressure reference is at least one of i) a personal weather station and ii) a wireless terminal.

7. The method of claim 1, wherein the second and third estimates of reference pressure correspond to the same lateral location.

8. The method of claim 1, wherein the delay between when i) the second pressure reference makes the second measurement of barometric pressure and ii) the second pressure reference network makes the second estimate of reference barometric pressure, is less than the delay between when i) the first pressure reference makes the first measurement of barometric pressure and ii) the first pressure reference network makes the first estimate of reference barometric pressure.

9. The method of claim 1, wherein a measurement accuracy of the first pressure reference is better than a measurement accuracy of the second pressure reference.

* * * * *